US012711887B2

(12) United States Patent
Wang et al.

(10) Patent No.: US 12,711,887 B2
(45) Date of Patent: Aug. 18, 2026

(54) DATA VOLTAGE SUPPLY CIRCUIT, DISPLAY DEVICE AND DRIVING METHOD

(71) Applicants: HEFEI BOE DISPLAY TECHNOLOGY CO., LTD., Hefei (CN); BOE TECHNOLOGY GROUP CO., LTD., Beijing (CN)

(72) Inventors: Jun Wang, Beijing (CN); Ke Dai, Beijing (CN); Chunyang Nie, Beijing (CN); Jianwei Sun, Beijing (CN); Yue Yang, Beijing (CN); Zhengru Pan, Beijing (CN)

(73) Assignees: HEFEI BOE DISPLAY TECHNOLOGY CO., LTD., Hefei (CN); BOE TECHNOLOGY GROUP CO., LTD., Beijing (CN)

( * ) Notice: Subject to any disclaimer, the term of this patent is extended or adjusted under 35 U.S.C. 154(b) by 0 days.

(21) Appl. No.: 18/703,502

(22) PCT Filed: Jul. 18, 2023

(86) PCT No.: PCT/CN2023/107891
§ 371 (c)(1),
(2) Date: Apr. 22, 2024

(87) PCT Pub. No.: WO2025/015518
PCT Pub. Date: Jan. 23, 2025

(65) Prior Publication Data

US 2025/0239197 A1 Jul. 24, 2025

(51) Int. Cl.
*G09G 3/20* (2006.01)

(52) U.S. Cl.
CPC ....... *G09G 3/2003* (2013.01); *G09G 2310/06* (2013.01); *G09G 2310/08* (2013.01); *G09G 2320/0666* (2013.01)

(58) Field of Classification Search
None
See application file for complete search history.

(56) References Cited

U.S. PATENT DOCUMENTS 7,608,809 B2 * 10/2009 Lin .................... H04N 25/767
250/214 R
10,991,290 B1 * 4/2021 Yang .................... G09G 3/20
(Continued)

FOREIGN PATENT DOCUMENTS

CN 1501706 A 6/2004
CN 101059941 A 10/2007
(Continued)

*Primary Examiner* — Kenneth Bukowski
(74) *Attorney, Agent, or Firm* — WHDA, LLP

(57) ABSTRACT

A data voltage supply circuit is applied to a display device, the display device includes a data driver, a plurality of columns of pixels and a plurality of columns data lines, the column of pixels includes M columns of sub-pixels; M is an integer greater than or equal to 3; the data driver includes a plurality of data voltage supply terminals; the data voltage supply circuit includes a plurality of supply circuits; the supply circuit is configured to control the M columns of sub-pixels included in a corresponding column of pixels to respectively receive a data voltage provided by a corresponding data voltage supply terminal, or to control the M columns of sub-pixels included in the corresponding column of pixels to obtain the data voltage provided to the M columns of sub-pixels according to a data voltage provided to at least one other column of pixels.

14 Claims, 10 Drawing Sheets

(56) References Cited

U.S. PATENT DOCUMENTS

| | | | | |
|---|---|---|---|---|
| 11,355,043 | B1 * | 6/2022 | Choi | G09G 3/3233 |
| 2004/0130520 | A1 * | 7/2004 | Maeda | G09G 3/20 345/100 |
| 2004/0212844 | A1 * | 10/2004 | Kato | H04N 1/40056 358/448 |
| 2015/0009194 | A1 * | 1/2015 | Kim | G09G 3/3233 345/80 |
| 2016/0267716 | A1 * | 9/2016 | Patel | G06F 3/013 |
| 2018/0096666 | A1 * | 4/2018 | Chung | G09G 3/3696 |
| 2019/0147786 | A1 * | 5/2019 | Kim | H10K 59/35 345/690 |
| 2019/0172399 | A1 * | 6/2019 | Chen | G09G 3/20 |
| 2021/0134223 | A1 | 5/2021 | Li | |
| 2021/0134233 | A1 * | 5/2021 | Huang | G09G 3/36 |
| 2023/0040448 | A1 * | 2/2023 | Zhang | G09G 3/2092 |

FOREIGN PATENT DOCUMENTS

| | | | |
|---|---|---|---|
| CN | 102682715 | B | 7/2014 |
| CN | 109643515 | A | 4/2019 |
| CN | 107886912 | B | 7/2020 |
| CN | 112419995 | B | 7/2022 |
| CN | 115064110 | A | 9/2022 |

* cited by examiner

DATA VOLTAGE SUPPLY CIRCUIT, DISPLAY DEVICE AND DRIVING METHOD

CROSS-REFERENCE TO RELATED APPLICATION

The present application is the U.S. national phase of PCT Application No. PCT/CN2023/107891 filed on Jul. 18, 2023, which is incorporated herein by reference in its entirety.

TECHNICAL FIELD

The present disclosure relates to the field of display technology, in particular to a data voltage supply circuit, a display terminal and a driving method.

BACKGROUND

The related display device cannot drive a high-resolution display screen with a low-resolution signal and cannot meet the low screen consumption.

SUMMARY

In one aspect, the present disclosure provides in some embodiments a data voltage supply circuit, applied to a display device, wherein the display device includes a data driver, a plurality of columns of pixels and a plurality of columns data lines, the column of pixels includes M columns of sub-pixels; M is an integer greater than or equal to 3; the data driver includes a plurality of data voltage supply terminals; the data voltage supply circuit includes a plurality of supply circuits; the supply circuit is configured to control the M columns of sub-pixels included in a corresponding column of pixels to respectively receive a data voltage provided by a corresponding data voltage supply terminal, or to control the M columns of sub-pixels included in the corresponding column of pixels to obtain the data voltage provided to the M columns of sub-pixels according to a data voltage provided to at least one other column of pixels.

Optionally, the supply circuit includes a first gating circuit and a second gating circuit; the column of sub-pixels are electrically connected to a corresponding column data line, and receive the data voltage through the corresponding column data line; the first gating circuit is electrically connected to the M data voltage supply terminals and current M columns data lines respectively, and is configured to control to connect or disconnect an mth data voltage supply terminal among the M data voltage supply terminals and an mth data line among the current M columns data lines; the mth data line is electrically connected to the mth column of sub-pixels in the M columns of sub-pixels included in the corresponding column of pixels; m is a positive integer less than or equal to M; the second gating circuit is respectively electrically connected to the current M columns data lines, a first group of M columns data lines electrically connected to the M columns of sub-pixels included in a first target column of pixels, and a second group of M columns data lines electrically connected to M columns of the sub-pixels included in a second target column of pixels, configured to control the data voltages received by the current M columns data lines according to the data voltage received by the first group of M columns data line and the data voltage received by the second group of M columns data lines; the first target column of pixels is a column of pixels except the corresponding column of pixels, the second target column of pixels is a column of pixels except the corresponding column of pixels, the first target column of pixels and the second target column of pixels are different columns of pixels; the current M columns data lines are data lines electrically connected to the M columns of sub-pixels included in the corresponding column of pixels; the data lines electrically connected to the M columns of sub-pixels in the first target column of pixels are directly electrically connected to a corresponding data voltage supply terminal, and the data lines electrically connected to the M columns of sub-pixels in the second target column of pixels are directly electrically connected to a corresponding data voltage supply terminal.

Optionally, the supply circuit includes a first gating circuit and a third gating circuit; the column of sub-pixels are electrically connected to corresponding column data line and receive the data voltage through the corresponding column data line; the first gating circuit is electrically connected to the M data voltage supply terminals and the current M columns data lines respectively, and is configured to control to connect or disconnect the mth data voltage supply terminal among the M data voltage supply terminals and the mth data line in the current M column data lines; the mth data line is electrically connected to the mth column of sub-pixels in the M columns of sub-pixels included in the corresponding column of pixels; m is a positive integer less than or equal to M; the third gating circuit is electrically connected to the current M columns data lines and the first group of M columns data lines electrically connected to the M column of sub-pixels included in the first target column of pixels, is configured to control the data voltage received by the current M columns data lines according to the data voltage received by the first group of M columns data lines; the first target column of pixels is a column of pixels except the corresponding column of pixels; the current M columns data lines are data lines electrically connected to the M columns of sub-pixels included in the corresponding column of pixels; a data line electrically connected to the M columns of sub-pixels in the first target column of pixels is directly electrically connected to the corresponding data voltage supply terminal.

Optionally, the first gating circuit includes M first switch circuits; an mth first switch circuit is electrically connected to the mth data voltage supply terminal among the M data voltage supply terminals and the mth data line among the current M columns data lines, respectively, and is configured to control to connect or disconnect the mth data voltage supply terminal and the mth data line.

Optionally, the second gating circuit includes M second switch circuits, M first resistors, M third switch circuits and M second resistors; an mth second switch circuit is electrically connected to the mth column data line in the first group of M columns data lines and a first terminal of the mth first resistor, respectively, and is configured to control to connect or disconnect the mth column data line in the first group of M columns data lines and the first terminal of the mth first resistor; a second terminal of the mth first resistor is electrically connected to the mth column data line in the current M columns data lines; a first terminal of the mth second resistor is electrically connected to the mth column data line among the current M columns data lines, and the mth third switch circuit is respectively electrically connected to the second terminal of the mth second resistor and the mth column data line in the second group of M columns data lines, and is configured to control to connect or disconnect the second terminal of the mth second resistor and the mth column data line in the second group of M columns data lines.

Optionally, the third gating circuit includes M third resistors and M fourth switch circuits; an mth fourth switch circuit is electrically connected to a first terminal of an mth third resistor and the mth column data line in the first group of M columns data lines, respectively, and is configured to control to connect or disconnect the first terminal of the mth third resistor and the mth column data line in the first group of M columns data lines; a second terminal of the mth third resistor is electrically connected to the mth column data line among the current M columns data lines; a data line electrically connected to the M columns of sub-pixels in the first target column of pixels is directly electrically connected to the corresponding data voltage supply terminal.

Optionally, the data driver includes at least one data driving circuit; the column of pixels includes three columns of sub-pixels; the data driving circuit includes N data voltage supply terminals; N is a positive integer; an ath supply circuit includes an ath first gating circuit and an ath second gating circuit; a is a positive integer; a first column of sub-pixels included in a (3a−1)th column of pixels is electrically connected to a (6a−2)th column data line, a second column of sub-pixels included in the (3a−1)th column of pixels is electrically connected to a (6a−1)th column data line, and a third column of sub-pixels included in the (3a−1)th column data line is electrically connected to a bath column data line; a first column of sub-pixels included in a (3a−2)th column of pixels is electrically connected to a (6a−5)th column data line, a second column of sub-pixels included in the (3a−2)th column of pixels is electrically connected to a (6a−4)th column data line, and a third column of sub-pixels included in the (3a−2)th column data line is electrically connected to a (6a−3)th column data line; a first column of sub-pixels included in a 3ath column of pixels is electrically connected to a (6a+1)th column data line, a second column of sub-pixels included in the 3ath column of pixels is electrically connected to a (6a+2)th column data line, and a third column of sub-pixels included in the 3ath column data line is electrically connected to a (6a+3)th column data line; the ath first gating circuit is respectively connected to the (6a−2)th column data line, the (6a−1)th column data line, the 6ath column data line, a (6a−2)th data voltage supply terminal, a (6a−1)th data voltage supply terminal, and a 6ath data voltage supply terminal, and is configured to control to connect or disconnect the (6a−2)th column data line and the (6a−2)th data voltage supply terminal, control to connect or disconnect the (6a−1)th column data line and the (6a−1)th data voltage supply terminal, and control to connect or disconnect the 6ath column data line and the bath data voltage supply terminal; the ath second gating circuit is respectively electrically connected to the (6a−5)th column data line, the (6a−4)th column data line, the (6a−3)th column data line, the (6a+1)th column data line, the (6a+2)th column data line and the (6a+3)th column data line, the (6a−2)th column data line, the (6a−1)th column of data line and the bath column data line, and is configured to control the data voltage received by the (6a−2)th column data line according to the data voltage received by the (6a−5)th column data line and the data voltage received by the (6a+1)th column data line, control the data voltage received by the the (6a−1)th column data line according to the data voltage received by the (6a−4)th column data line and the data voltage received by the (6a+2)th column data line, control the data voltage received by the bath column data line according to the data voltage received by the (6a−3)th column data line and the data voltage received by the (6a+3)th column data line; the (6a−5)th column data line is directly electrically connected to the (6a−5)th data voltage supply terminal, the (6a−4)th column data line is directly electrically connected to the (6a−4)th data voltage supply terminal, the (6a−3)th column data line is directly electrically connected to the (6a−3)th data voltage supply terminal, the (6a+1)th column data line is directly electrically connected to the (6a+1)th data voltage supply terminal, the (6a+2)th column data line is directly electrically connected to the (6a+2)th data voltage supply terminal, the (6a+3)th column data line is directly electrically connected to the (6a+3)th data voltage supply terminal.

Optionally, N is multiple of 6; the data voltage supply circuit includes a fourth gating circuit; the fourth gating circuit is respectively connected to an Nth column data line, an (N−1)th column data line, an (N−2)th column data line, an (N−3)th column data line, an (N−4)th column data line and an (N−5)th column data line, configured to control to connect or disconnect the Nth column data line and the (N−3)th column data line, and control to connect or disconnect the (N−1)th column data line and the (N−4)th column data line, and control to connect or disconnect the (N−2)th column data line and the (N−5)th column data line.

Optionally, Nis multiple of 6, and the data driver includes B data driver circuits; B is an integer greater than 1; a bth data driving circuit is electrically connected to a bth group of N columns data lines, a (b+1)th data circuit is electrically connected to a (b+1)th group of N columns data lines, b is a positive integer, and b+1 is less than or equal to B; the data voltage supply circuit includes a fifth gating circuit; the fifth gating circuit is respectively connected to the (N−5)th data line in the bth group of N columns data lines, the (N−4)th data line in the bth group of N columns data lines, and the (N−3)th data line in the bth group of N columns data lines, the (N−2)th data line in the bth group of N columns data lines, the (N−1)th data line in the bth group of N columns data lines, the Nth data line in the bth group of N columns data lines, a first column data line in the (b+1)th group of N columns data lines, a second column data line in the (b+1)th group of N columns data lines, and a third column data line in the (b+1)th group of N columns data lines, and is configured to control the data voltage received by the (N−2)th data line in the bth group of N columns data lines according to the data voltage received by the (N−5)th data line in the bth group of N columns data lines and the first column data line in the (b+1)th group of N columns data lines, control the data voltage received by the (N−1)th data line in the bth group of N columns data lines according to the data voltage received by the (N−4)th data line in the bth group of N columns data lines and the data voltage received by the second column data line in the (b+1)th group of N columns data lines, control the data voltage received by the Nth data line in the bth group of N columns data lines according to the data voltage received by the (N−3)th data line in the bth group of N columns data lines and the data voltage received by the third column data line in the (b+1)th group of N columns data lines.

Optionally, the data driver includes at least one data driving circuit; the column of pixels includes three columns of sub-pixels; the data driving circuit includes N data voltage supply terminals; N is a positive integer; the ath supply circuit includes the ath first gating circuit and the ath third gating circuit; a is a positive integer; the ath first gating circuit is respectively connected to the (6a−2)th column data line, the (6a−1)th column data line, the 6ath column data line, the (6a−2)th data voltage supply terminal, the (6a−1)th data voltage supply terminal, and the 6ath data voltage supply terminal, and is configured to control to connect or disconnect the (6a−2)th column data line and the (6a−2)th data voltage supply terminal, and control to connect or disconnect the (6a−1)th column data line and the (6a−1)th data voltage supply terminal, and control to connect or disconnect the bath column data line and the 6ath data voltage supply terminal; the ath third gating circuit is respectively connected to the (6a−5)th column data line, the (6a−4)th column data line, the (6a−3)th column data line, the (6a−2)th column data line, the (6a−1)th column data line and the 6ath column data line, and is configured to control the data voltage on the (6a−2)th column data line according to the data voltage on the (6a−5)th column data line, control the data voltage on the (6a−1)th column data line according to the data voltage on the (6a−4)th column data line and control the data voltage on the 6ath column data line according to the data voltage on the (6a−3)th column data line.

Optionally, the mth first switching circuit includes the mth first switching transistor; a gate electrode of the mth first switching transistor is electrically connected to a first control voltage terminal, a first electrode of the mth first switching transistor is electrically connected to the mth data voltage supply terminal, and a second electrode of the mth first switching transistor is electrically connected to the mth data line; the data voltage supply circuit includes a first control circuit; the first control circuit is configured to provide a first control voltage to the first control voltage terminal to control the mth first switching transistor to be turned on or off.

Optionally, the mth second switching circuit includes an mth second switching transistor, and the mth third switching circuit includes an mth third switching transistor; a gate electrode of the mth second switching transistor is electrically connected to a second control voltage terminal, and a first electrode of the mth second switching transistor is connected to the mth column data in the first group of M columns data lines, a second electrode of the mth second switching transistor is electrically connected to the first terminal of the mth first resistor; a gate electrode of the mth third switching transistor is electrically connected to the second control voltage terminal, and a first electrode of the mth third switching transistor is electrically connected to the second terminal of the mth second resistor, a second electrode of the mth third switching transistor is electrically connected to the mth column data line in the second group of M columns data lines; the data voltage supply circuit includes a second control circuit; the second control circuit is configured to provide a second control voltage to the second control voltage terminal to control the mth second switching transistor to be turned on or off, and to control the mth third switching transistor to be turned on or off.

In a second aspect, an embodiment of the present disclosure provides a display device, comprising a plurality of rows gate lines, a plurality of columns data lines, a plurality of rows and a plurality of columns of pixels, a driving circuit and the data voltage supply circuit; wherein the driving circuit is electrically connected to the plurality of rows gate lines, and configured to provide a driving signals to the gate line; pixels located in a same row are electrically connected to a corresponding row gate line, configured to receive the driving signal provided by the corresponding row gate line; pixels located in a same column are electrically connected to a corresponding column data line, configured to receive the data voltage from the corresponding column data line.

In a third aspect, an embodiment of the present disclosure provides a driving method, applied to the display device, wherein the driving method comprises: during a driving period, providing, by the driving circuit, the driving signal to the gate line to control a plurality of rows scanning lines to be turned on sequentially; during the driving period, there being an overlapping time period and a non-overlapping time period between valid time periods of scanning signals provided by at least two adjacent gate lines among the plurality of rows gate lines that are turned on sequentially; the data voltage received by the data line during at least part of the overlapping time period being the same as the data voltage received by the data line during at least part of the non-overlapping time period.

In a fourth aspect, an embodiment of the present disclosure provides a driving method, applied to the display device according to claim 13, wherein the driving cycle includes a plurality of driving phases arranged sequentially; a (2n−1)th row scanning signal provided by a (2n−1)th row scanning line is the same as a 2nth row scanning signal provided by a 2nth row scanning line; the driving method includes: in an nth driving phase, the (2n−1)th row scan line and the 2nth row scan line being turned on, and the (2n−1)th row of sub-pixels and the 2nth row of sub-pixels receiving the data voltage provided by the corresponding data line; n is a positive integer.

DETAILED DESCRIPTION

Figure 1:
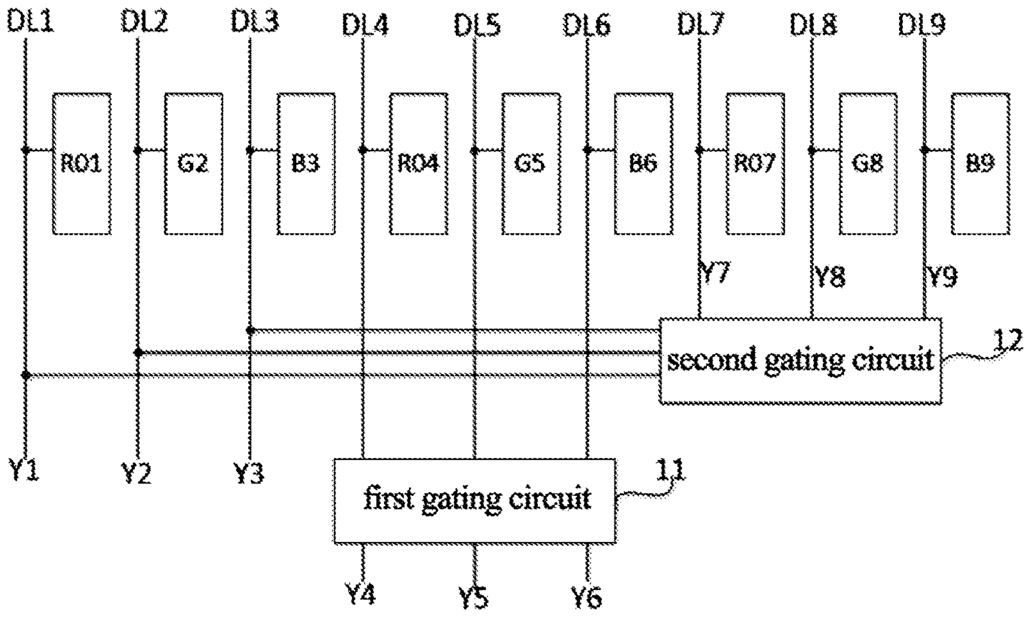
FIG. 1 is a structural diagram of a data voltage supply circuit according to at least one embodiment of the present disclosure.

The following will clearly and completely describe the technical solutions in the embodiments of the present disclosure with reference to the accompanying drawings. Obviously, the described embodiments are only some of the embodiments of the present disclosure, not all of them. Based on the embodiments in the present disclosure, all other embodiments obtained by those ordinary skill in the art without making creative work belong to the protection scope of the present disclosure.

The transistors used in all embodiments of the present disclosure may be thin film transistors, field effect transistors, or other devices with the same characteristics. In the embodiment of the present disclosure, in order to distinguish the two electrodes of the transistor except the gate electrode, one electrode is called the first electrode and the other electrode is called the second electrode.

In actual operation, when the transistor is a thin film transistor or a field effect transistor, the first electrode may be a drain electrode, and the second electrode may be a source electrode; or, the first electrode may be a source electrode, the second electrode may be a drain electrode.

The data voltage supply circuit described in the embodiment of the present disclosure is applied to a display device. The display device includes a data driver, a plurality of columns of pixels and a plurality of columns of data lines. The column of pixels includes M columns of sub-pixels; M is an integer greater than or equal to 3; the data driver includes a plurality of data voltage supply terminals; the data voltage supply circuit includes a plurality of supply circuits;

The supply circuit is configured to control the M columns of sub-pixels included in the corresponding column of pixels to respectively receive the data voltage provided by the corresponding data voltage supply terminal, or to control the M columns of sub-pixels included in the corresponding column of pixels to obtain the data voltage provided to the M columns of sub-pixels according to the data voltage provided to at least one other column of pixels.

When the data voltage supply circuit described in the embodiment of the present disclosure is working, the supply circuit can control the M columns of sub-pixels included in the corresponding column of pixels to obtain the data voltage provided to the M column of sub-pixels based on the data voltage provided to at least one other column of pixels. The data voltage can drive a high-resolution display screen with a low-resolution signal to meet the low screen consumption.

In at least one embodiment of the present disclosure, the supply circuit includes a first gating circuit and a second gating circuit; the column of sub-pixels are electrically connected to a corresponding column data line, and receive the data voltage through the corresponding column data line;

The first gating circuit is electrically connected to the M data voltage supply terminals and the current M column data line respectively, and is configured to control to connect or disconnect the mth data voltage supply terminal among the M data voltage supply terminals and the mth data line among the current M column data lines; the mth data line is electrically connected to the mth column of sub-pixels in the M columns of sub-pixels included in the corresponding column of pixels; m is a positive integer less than or equal to M;

The second gating circuit is respectively electrically connected to the current M columns data lines, a first group of M columns data lines electrically connected to the M columns of sub-pixels included in the first target column of pixels, and the second group of M columns data lines electrically connected to the M columns of the sub-pixels included in the second target column of pixels, configured to control the data voltages received by the current M columns data lines according to the data voltage received by the first group of M columns data line and the data voltage received by the second group of M columns data lines.

The first target column of pixels is a column of pixels except the corresponding column of pixels, the second target column of pixels is a column of pixels except the corresponding column of pixels, the first target column of pixels and the second target column of pixels are pixels in a different column;

The current M columns data lines are data lines electrically connected to the M columns of sub-pixels included in the corresponding column of pixels;

The data lines electrically connected to the M columns of sub-pixels in the first target column of pixels are directly electrically connected to the corresponding data voltage supply terminals, and the data lines electrically connected to the M columns of sub-pixels in the second target column of pixels are directly electrically connected to the corresponding data voltage supply terminal.

In specific implementation, the supply circuit may include a first gating circuit and a second gating circuit. The first gating circuit may control to connect or disconnect the current M columns data lines and the corresponding data voltage supply terminals respectively. The second gating circuit can control to provide data voltages to the current M columns data lines according to the data voltages respectively provided to the M columns of sub-pixels included in the two target columns of pixels.

In at least one embodiment of the present disclosure, M is equal to 3 as an example for description, but it is not limited to this. In actual operation, M can be an integer greater than 3.

As shown in FIG. 1, the supply circuit P0 includes a first gating circuit 11 and a second gating circuit 12; the first column of pixels includes the first column of red sub-pixels R01, the second column of green sub-pixels G2, the third column of blue sub-pixels B3, the fourth column of red sub-pixels R04, the fifth column of green sub-pixels G5, the sixth column of blue sub-pixels B6, the seventh column of red sub-pixels R07, the eighth column of green sub-pixels G8 and the ninth column of blue sub-pixels B9;

The first column of red sub-pixels R01 are electrically connected to the first column data line DL1, the second column of green sub-pixels G2 are electrically connected to the second column data line DL2, and the third column of blue sub-pixels B3 are electrically connected to the third column of data line DL3, the fourth column of red sub-pixels R04 are electrically connected to the fourth column data line DL4, the fifth column of green sub-pixels G5 are electrically connected to the fifth column data line DL5, the sixth column of blue sub-pixels B6 are electrically connected to the sixth column data lines DL6, the seventh column of red sub-pixels R07 are electrically connected to the seventh column data line DL7, the eighth column of green sub-pixels G8 is electrically connected to the eighth column data line DL8, the ninth column of blue sub-pixels B9 are electrically connected to the ninth column data line DL9;

Among them, the current M columns data lines are: the fourth column data line DL4, the fifth column data line DL5 and the sixth column data line DL6;

The first target column of pixels are the first column of pixels, and the second target column of pixels are the second column of pixels;

The first gating circuit 11 is respectively electrically connected to the fourth data voltage supply terminal Y4, the fifth data voltage supply terminal Y5, the sixth data voltage supply terminal Y6, the fourth column data line DL4, the fifth column data line DL5 and the sixth column data line DL6, is configured to control to connect or disconnect the fourth data voltage supply terminal Y4 and the fourth column data line DL4, and connect or disconnect the fifth data voltage supply terminal Y5 and the fifth column data line DL5, connect or disconnect the sixth data voltage supply terminal Y6 and the sixth column data line DL6;

The second gate circuit 12 is connected to the fourth column data line DL4, the fifth column data line DL5, the sixth column data line DL6, the first column data line DL1, the second column data line DL2, the third column data line DL3, the seventh column data line DL7, the eighth column data line DL8 and the ninth column data line DL9, is configured to control the data voltage provided by the fourth column data line DL4 according to the data voltage provided by the first column data line DL1 and the data provided by the seventh column data line DL7, and control the data voltage provided by the fifth column data line DL5 according to the data voltage provided by the second column data line DL2 and the data voltage provided by the eighth column data line DL8, control the data voltage provided by the sixth column data line DL6 according to the data voltage provided by the third column data line DL3 and the data voltage provided by the ninth column data line DL9;

The first column data line DL1 is electrically connected to the first data voltage supply terminal Y1, the second column data line DL2 is electrically connected to the second data voltage supply terminal Y2, and the third column data line DL3 is electrically connected to the third data voltage supply terminal Y3, the seventh column data line DL7 is electrically connected to the seventh data voltage supply terminal Y7, the eighth column data line DL8 is electrically connected to the eighth data voltage supply terminal Y8, the ninth column data line DL9 is electrically connected to the ninth data voltage supply terminal Y9.

When at least one embodiment shown in FIG. 1 is working,

When the first gating circuit 11 controls to connect the fourth data voltage supply terminal Y4 and the fourth column data line DL4, to connect the fifth data voltage supply terminal Y5 and the fifth column data line DL5, and to connect the sixth data voltage supply terminal Y6 and the sixth column data line DL6, DL4 directly receives the data voltage provided by Y4, DL5 directly receives the data voltage provided by Y5, and DL6 directly receives the data voltage provided by Y6;

When the first gating circuit 11 controls to disconnect the fourth data voltage supply terminal Y4 from the fourth column data line DL4, to disconnect the fifth data voltage supply terminal Y5 from the fifth column data line DL4, and to disconnect the sixth data voltage supply terminal Y6 and the sixth column data line DL6, the second gating circuit 12 controls the data voltage provided by the fourth column data line DL4 according to the data voltage provided by the first column data line DL1 and the data voltage provided by the seventh column data line DL7, controls the data voltages provided by the fifth column data line DL5 according to the data voltage provided by the second column data line DL2 and the data voltage provided by the eighth column data line DL8, and controls the data voltage of the sixth column according to the data voltage provided by the third column data line DL3 and the data voltage provided by the ninth column data line DL9, in this way, the low-resolution data voltage signal may be used to drive the high-resolution display screen.

In at least one embodiment shown in FIG. 1, each row of sub-pixels in each column of sub-pixels is electrically connected to a corresponding scan line to receive a scan signal provided by the scan line.

In at least one embodiment of the present disclosure, the supply circuit may be provided on a Driver Integrated Circuit (Driver IC).

In at least one embodiment of the present disclosure, the supply circuit includes a first gating circuit and a third gating circuit; the column of sub-pixels are electrically connected to corresponding column data line and receive data voltages through the corresponding column data line;

The first gating circuit is electrically connected to the M data voltage supply terminals and the current M columns data lines respectively, and is configured to control to connect or disconnect the mth data voltage supply terminal among the M data voltage supply terminals and the mth data line in the current M column data lines; the mth data line is electrically connected to the mth column of sub-pixels in the M columns of sub-pixels included in the corresponding column of pixels; m is a positive integer less than or equal to M;

The third gating circuit is electrically connected to the current M columns data lines and a first group of M columns data lines electrically connected to the M column of sub-pixels included in the first target column of pixels, is configured to control the data voltage received by the current M columns data lines according to the data voltage received by the first group of M columns data lines;

The first target column of pixels is a column of pixels other than the corresponding column of pixels;

The current M columns data lines are data lines electrically connected to the M columns of sub-pixels included in the corresponding column of pixels;

The data lines electrically connected to the M columns of sub-pixels in the first target column of pixels are directly electrically connected to the corresponding data voltage supply terminals.

In specific implementation, the supply circuit may include a first gating circuit and a third gating circuit. The first gating circuit may control to connect or disconnect the current M columns data lines and the corresponding data voltage supply terminals respectively. The third gating circuit may control the data voltage received by the current M columns data lines according to the data voltage provided to the first target column of pixels.

Figure 2:
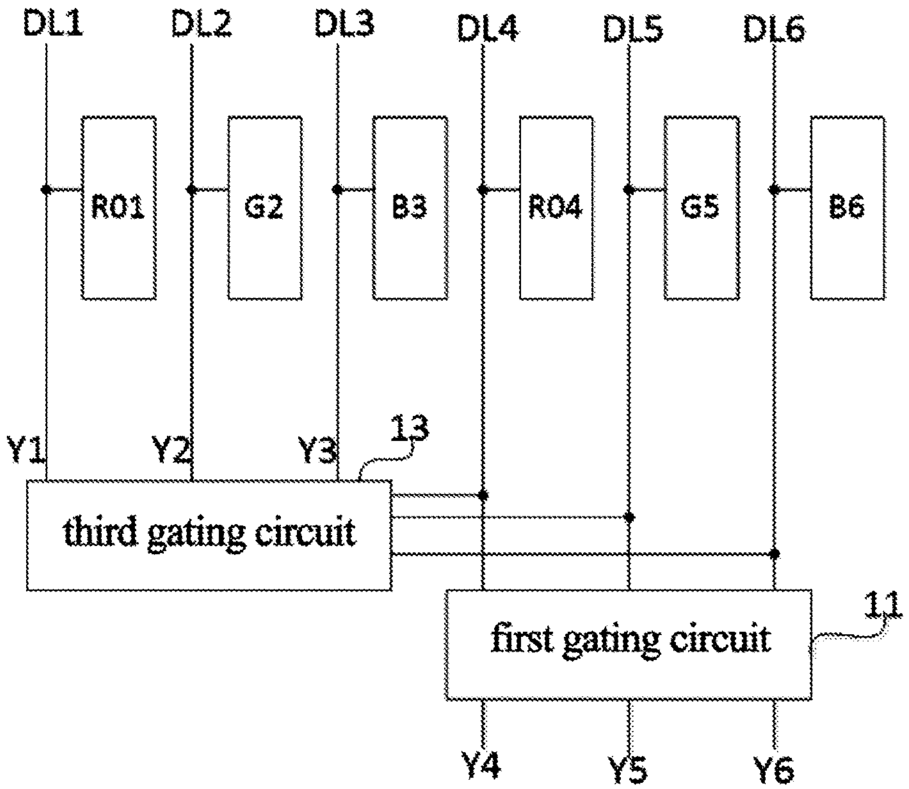
FIG. 2 is a structural diagram of a data voltage supply circuit according to at least one embodiment of the present disclosure.

As shown in FIG. 2, the supply circuit P0 includes a first gating circuit 11 and a third gating circuit 13;

The first column of pixels has the first column of red sub-pixels R01, the second column of green sub-pixels G2, the third column of blue sub-pixels B3, the fourth column of red sub-pixels R04, the fifth column of green sub-pixels G5 and the sixth column of blue sub-pixels B6;

The first column of red sub-pixels R01 are electrically connected to the first column data line DL1, the second column of green sub-pixels G2 are electrically connected to the second column data line DL2, and the third column of blue sub-pixels B3 are electrically connected to the third column data line DL3, the fourth column of red sub-pixels R04 are electrically connected to the fourth column data line DL4, the fifth column of green sub-pixels G5 are electrically connected to the fifth column data line DL5, the sixth column of blue sub-pixels B6 are electrically connected to the sixth column data line DL6;

Among them, the current M columns data lines are: the fourth column data line DL4, the fifth column data line DL5 and the sixth column data line DL6;

The first gating circuit 11 is respectively connected to the fourth data voltage supply terminal Y4, the fifth data voltage supply terminal Y5, the sixth data voltage supply terminal Y6, the fourth column data line DL4, the fifth column data line DL5 and the sixth column data line DL6, configured to control to connect or disconnect the fourth data voltage supply terminal Y4 and the fourth column data line DL4, and the fifth data voltage supply terminal Y5 and the fifth column data line DL5, and the sixth data voltage supply terminal Y6 and the sixth column data line DL6;

The first column data line DL1 is electrically connected to the first data voltage supply terminal Y1, the second column data line DL2 is electrically connected to the second data voltage supply terminal Y2, and the third column data line DL3 is electrically connected to the third data voltage supply terminal Y3;

The third gating circuit 13 is connected to the first column data line DL1, the second column data line DL2, the third column data line DL3, the fourth column data line DL4, the fifth column data line DL5 and the sixth column data line DL6 respectively and configured to control the data voltage controlled by the fourth column data line DL4 according to the data voltage provided by the first column data line DL1, and control the data voltage controlled by the fifth column data line DL5 according to the data voltage provided by the second column data line DL2, control the data voltage controlled by the sixth column data line DL6 according to the data voltage provided by the third column data line DL3.

When at least one embodiment shown in FIG. 2 is working,

When the first gating circuit 11 controls to connect the fourth data voltage supply terminal Y4 and the fourth column data line DL4, controls to connect the fifth data voltage supply terminal Y5 and the fifth column data line DL5, controls to connect the sixth data voltage supply terminal Y6 and the sixth column data line DL6, DL4 receives the data voltage provided by Y4, DL5 receives the data voltage provided by Y5, and DL6 receives the data voltage provided by Y6;

When the first gating circuit 11 controls to disconnect the fourth data voltage supply terminal Y4 from the fourth column data line DL4, disconnect the fifth data voltage supply terminal Y5 from the fifth column data line DL5, disconnect the sixth data voltage supply terminal Y6 from the sixth column data line DL6, the third gating circuit 13 controls the data voltage controlled by the fourth column data line DL4 according to the data voltage provided by the first column data line DL1, controls the data voltage controlled by the fifth column data line DL5 according to the data voltage provided by the second column data line DL2, controls the data voltage controlled by the sixth column data line DL6 according to the data voltage provided by the third column data line DL3, so that a low-resolution data voltage signal can be configured to drive a high-resolution display screen.

When at least one embodiment shown in FIG. 2 is working, when the first gating circuit 11 controls to disconnect the fourth data voltage supply terminal Y4 from the fourth column data line DL4, disconnect the fifth data voltage supply terminal Y5 from the fifth column data line DL5, and disconnect the sixth data voltage supply terminal Y6 from the sixth column data line DL6, the second gating circuit 12 controls the data voltage controlled by the fourth column data line DL4 according to the data voltage provided by the first column data line DL1, and controls the data voltage controlled by the fifth column data line DL5 according to the data voltage provided by the second column data line DL2, controls the data voltage controlled by the sixth column data line DL6 according to the data voltage provided by the third column data line DL3, When the Ath row of sub-pixels are turned on, the data voltage received by the Ath row and the fourth column of sub-pixels is the average value of the data voltage received by the Ath row and the first column of sub-pixels and the data voltage of the Ath row and the seventh column of the sub-pixels;

The data voltage received by the Ath row and fifth column of sub-pixel is the average value of the data voltage received by the Ath row and the second column of sub-pixels and the data voltage received by the Ath row and the eighth column of sub-pixels;

The data voltage received by the Ath row and the sixth column of sub-pixels is the average value of the data voltage received by the Ath row and the third column of sub-pixels and the data voltage received by the Ath row and ninth column of sub-pixels;

A is a positive integer;

That is, the transmittance of the Ath row and fourth column of sub-pixels is the average transmittance of the Ath row and first column of sub-pixels and the transmittance of the Ath row and seventh column of sub-pixels;

The transmittance of the Ath row and fifth column of sub-pixels is the average transmittance of the Ath row and second column of sub-pixels and the transmittance of the Ath row and eighth column of sub-pixels;

The transmittance of the Ath row and sixth column of sub-pixels is the average transmittance of the Ath row and third column of sub-pixels and the transmittance of the Ath row and ninth column of sub-pixels;

The above method can achieve a uniform transition of horizontal pictures.

Optionally, the first gating circuit includes M first switch circuits;

The mth first switch circuit is electrically connected to the mth data voltage supply terminal among the M data voltage supply terminals and the mth data line among the current M columns data lines, respectively, and is configured to control to connect or disconnect the mth data voltage supply terminal and the mth data line.

In specific implementation, the first gating circuit may include M first switch circuits, and the mth first switch circuit controls to connect or disconnect the mth data voltage supply terminal and the mth data line.

Figure 3:
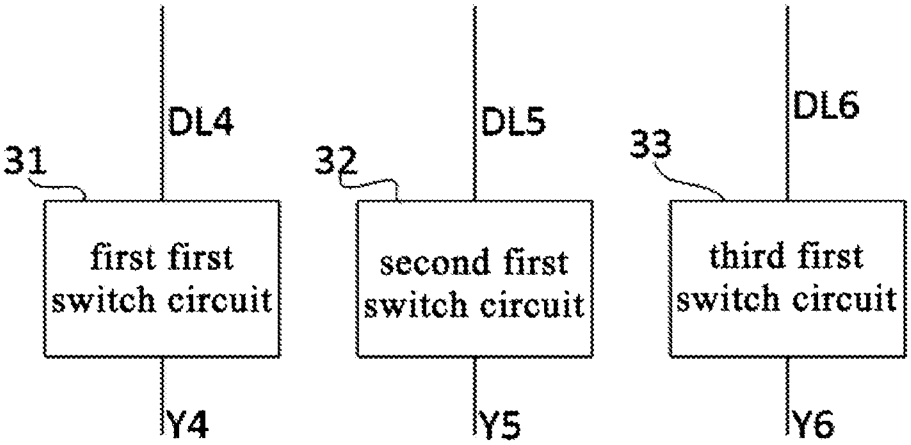
FIG. 3 is a structural diagram of the first gating circuit according to at least one embodiment of the present disclosure.

As shown in FIG. 3, at least one embodiment of the first gating circuit may include a first first switch circuit 31, a second first switch circuit 32, and a third first switch circuit 33;

The first first switch circuit 31 is electrically connected to the fourth data voltage supply terminal Y4 and the fourth column data line DL4 respectively, and is configured to control to connect or disconnect the fourth data voltage supply terminal Y4 and the fourth column data line DL4;

The second first switch circuit 32 is electrically connected to the fifth data voltage supply terminal Y5 and the fifth column data line DL5 respectively, and is configured to control to connect or disconnect the fifth data voltage supply terminal Y5 and the fifth column data line DL5;

The third first switch circuit 33 is electrically connected to the sixth data voltage supply terminal Y6 and the sixth column data line DL6 respectively, and is configured to control to connect or disconnect the sixth data voltage supply terminal Y6 and the sixth column data line DL6.

When at least one embodiment of the present disclosure shown in FIG. 3 is working, the Ath row of sub-pixels are electrically connected to the Ath row scan line. When the Ath row scan line is turned on, When the first first switch circuit 31 controls to connect the fourth data voltage supply terminal Y4 and the fourth column data line DL4, the second first switch circuit 32 controls to connect the fifth data voltage supply terminal Y5 and the fifth column data line DL5, and the third first switch circuit 33 controls to connect the sixth data voltage supply terminal Y6 and the sixth column data line DL6, the Ath row and the fourth column of sub-pixels directly receive the data voltage provided by Y4, the Ath row and fifth column of sub-pixels directly receive the data voltage provided by Y5, and the Ath row and sixth column of sub-pixels directly receive the data voltage provided by Y6;

A is a positive integer.

Optionally, the second gating circuit includes M second switch circuits, M first resistors, M third switch circuits and M second resistors;

The mth second switch circuit is electrically connected to the mth column data line in the first group of M columns data lines and the first terminal of the mth first resistor, respectively, and is configured to control to connect or disconnect the mth column data line in the first group of M columns data lines and the first terminal of the mth first resistor; the second terminal of the mth first resistor is electrically connected to the mth column data line in the current M columns data lines;

The first terminal of the mth second resistor is electrically connected to the mth column data line among the current M columns data lines, and the mth third switch circuit is respectively electrically connected to the second terminal of the mth second resistor and the mth column data line in the second group of M columns data lines, and is configured to control to connect or disconnect the second terminal of the mth second resistor and the mth column data line in the second group of M columns data lines.

In specific implementation, the second gating circuit may include M second switch circuits, M first resistors, M third switch circuits and M second resistors, and the mth second switch circuit controls to connect or disconnect the mth column data line in the first group of M columns data lines and the first terminal of the mth first resistor; mth third switch circuit controls to connect or disconnect the second terminal of the mth second resistor and the mth column data line in the second group of M columns data lines.

Figure 4:
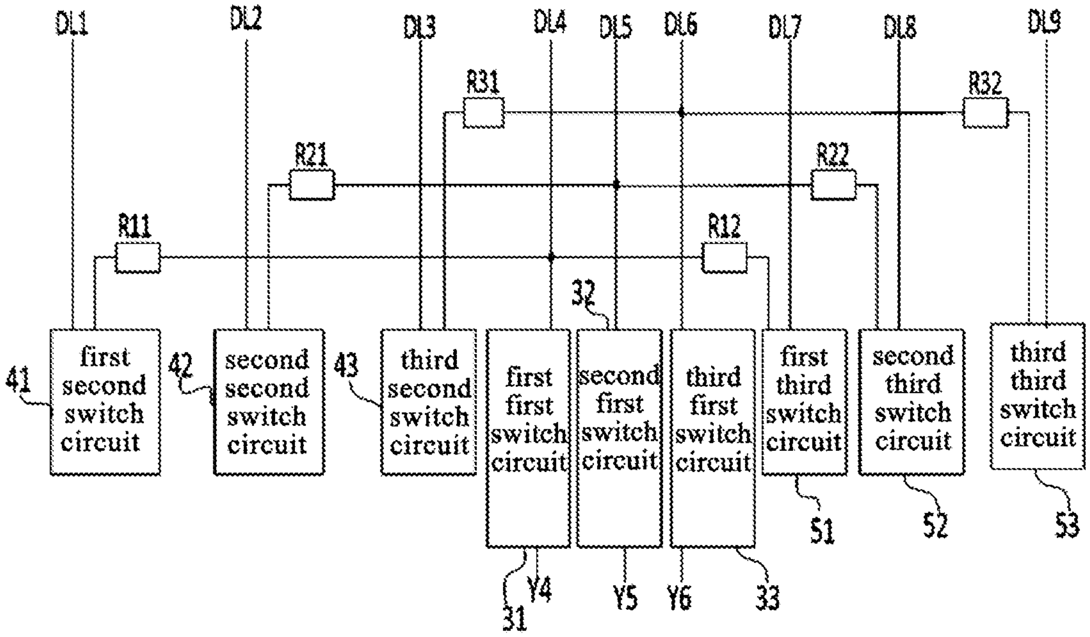
FIG. 4 is a structural diagram of the second gating circuit according to at least one embodiment of the present disclosure.

As shown in FIG. 4, at least one embodiment of the second gating circuit includes a first second switch circuit 41, a second second switch circuit 42, a third second switch circuit 43, a first first resistor R11, a second first resistor R21, a third first resistor R31, a first third switch circuit 51, a second third switch circuit 52, a third third switch circuit 53, a first second resistor R12, a second second resistor R22 and a third second resistor R32;

The first second switch circuit 41 is electrically connected to the first column data line DL1 and the first terminal of the first first resistor R11 respectively, and is configured to control to connect or disconnect the first column data line DL1 and the first terminal of the first first resistor R11, and the second terminal of the first first resistor R11 is electrically connected to the fourth column data line DL4;

The second second switch circuit 42 is electrically connected to the second column data line DL2 and the first terminal of the second first resistor R21 respectively, and is configured to control to connect or disconnect the second column data line DL2 and the first terminal of the second first resistor R21, and the second terminal of the second first resistor R21 is electrically connected to the fifth column data line DL5;

The third second switch circuit 43 is electrically connected to the third column data line DL3 and the first terminal of the third first resistor R31 respectively, and is configured to control to connect or disconnect the third column data line DL3 and the first terminal of the third first resistor R31, and the second terminal of the third first resistor R31 is electrically connected to the sixth column data line DL6;

The first terminal of the first second resistor R12 is electrically connected to the fourth column data line DL4;

The first third switch circuit 51 is electrically connected to the second terminal of the first second resistor R12 and the seventh column data line DL7 respectively, and is configured to control to connect or disconnect the second terminal of the first second resistor R12 and the seventh column data line DL7;

The first terminal of the second second resistor R22 is electrically connected to the fifth column data line DL5;

The second third switch circuit 52 is electrically connected to the second terminal of the second second resistor R22 and the eighth column data line DL8 respectively, and is configured to control to connect or disconnect the second terminal of the second second resistor R22 and the eighth column data line DL8;

The first terminal of the third second resistor R32 is electrically connected to the sixth column data line DL6;

The third third switch circuit 53 is electrically connected to the second terminal of the third second resistor R32 and the ninth column data line DL9 respectively, and is configured to control to connect or disconnect the second terminal of the third second resistor R32 and the ninth column data line DL9.

When at least one embodiment of the present disclosure shown in FIG. 4 is working, the Ath row of sub-pixels are electrically connected to the Ath row scan line. When the Ath row scan line is turned on (A is a positive integer), When the first second switch circuit 41 controls to connect the first column data line DL1 and the first terminal of the first first resistor R11, the second second switch circuit 42 controls to connect the second column data line DL2 and the first terminal of the second first resistor R21, and the third second switch circuit 43 controls to connect the third column data line DL3 and the first terminal of the third first resistor R31, the first third switch circuit 51 controls to connect the second terminal of the first second resistor R12 and the seventh column data line DL7, and the second third switch circuit 52 controls to connect the second terminal of the second second resistor R22 and the eighth column data line DL8, and the third third switch circuit 53 controls to connect the second terminal of the third second resistor R32 and the ninth column data lines DL9, The data voltage received by the Ath row and fourth column of sub-pixels is the average value of the data voltage received by the Ath row and first column of sub-pixels and the data voltage received by the Ath row and seventh column of sub-pixels;

The data voltage received by the Ath row and fifth column of sub-pixels is the average value of the data voltage received by the Ath row and second column of sub-pixels and the data voltage received by the Ath row and eighth column of sub-pixels The data voltage received by the Ath row and sixth column of sub-pixels is the average value of the data voltage received by the Ath row and third column of sub-pixels and the data voltage received by the Ath row and ninth column of sub-pixels.

In FIG. 4, the one labeled 31 is the first first switch circuit, the one labeled 32 is the second first switch circuit, and the one labeled 33 is the third first switch circuit.

In at least one embodiment of the present disclosure, the third gating circuit includes M third resistors and M fourth switch circuits;

The mth fourth switch circuit is electrically connected to the first terminal of the mth third resistor and the mth column data line in the first group of M columns data lines, respectively, and is configured to control to connect or disconnect the first terminal of the mth third resistor and the mth column data line in the first group of M columns data lines;

The second terminal of the mth third resistor is electrically connected to the mth column data line among the current M columns data lines;

The data lines electrically connected to the M columns of sub-pixels in the first target column of pixels are directly electrically connected to the corresponding data voltage supply terminals.

In specific implementation, the third gating circuit includes M third resistors and M fourth switch circuits; the mth fourth switch controls to connect or disconnect the first terminal of the mth third resistor and the mth column data line among the first group of M columns data lines.

Figure 5A:
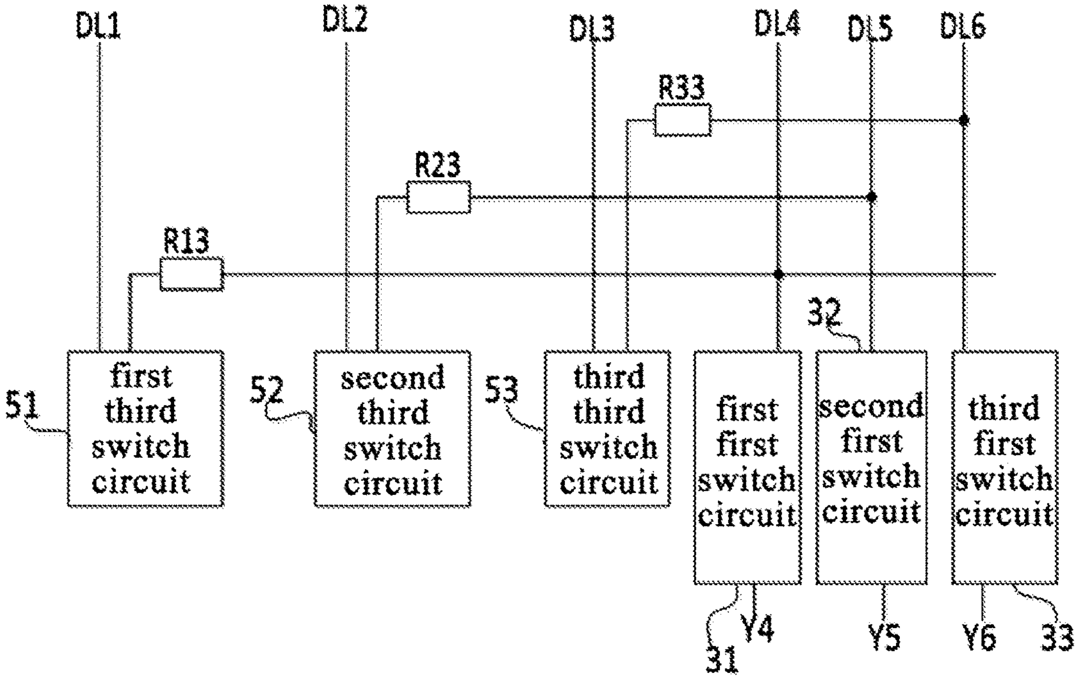
FIG. 5A is a structural diagram of a data voltage supply circuit according to at least one embodiment of the present disclosure.

As shown in FIG. 5A, the third gating circuit includes a first third resistor R13, a second third resistor R23, a third third resistor R33, a first fourth switch circuit 51, a second fourth switch circuit 52 and the third fourth switch circuit 53;

The first fourth switch circuit 51 is electrically connected to the first terminal of the first third resistor R13 and the first column data line DL1 respectively, and is configured to control to connect or disconnect the first terminal of the first third resistor R13 and the first column data line DL1; the second terminal of the first third resistor R13 is electrically connected to the fourth column data line DL4;

The second fourth switch circuit 52 is electrically connected to the first terminal of the second third resistor R23 and the second column data line DL2 respectively, and is configured to control to connect or disconnect the first terminal of the second third resistor R23 and the second column data line DL2; the second terminal of the second third resistor R23 is electrically connected to the fifth column data line DL5;

The third fourth switch circuit 53 is electrically connected to the first terminal of the third third resistor R33 and the third column data line DL3 respectively, and is configured to control to connect or disconnect the first terminal of the third third resistor R33 and the third column data line DL3; the second terminal of the third resistor R33 is electrically connected to the sixth column data line DL6.

When at least one embodiment of the present disclosure shown in FIG. 5A is working, the Ath row of sub-pixels are electrically connected to the Ath row scan line. When the Ath row scan line is turned on (A is a positive integer), When the first fourth switch circuit 51 controls to connect the first terminal of the first third resistor R13 and the first column data line DL1, the second fourth switch circuit 52 controls to connect the second terminal of the second third resistor R23 and the second column data line DL2, and the third fourth switch circuit 53 controls to connect the first terminal of the third third resistor R33 and the third column data line DL3, The data voltage received by the Ath row and fourth column of sub-pixels is slightly smaller than the data voltage received by the Ath row and first column of sub-pixels. The data voltage received by the Ath row and fifth column of sub-pixels is slightly smaller than the data voltage received by the Ath row and fifth column of sub-pixels. The data voltage received by the Ath row and sixth column of the sub-pixels is slightly smaller than the data voltage received by the Ath row and first column of sub-pixels.

In FIG. 5A, the one labeled 31 is the first first switch circuit, the one labeled 32 is the second first switch circuit, and the one labeled 33 is the third first switch circuit.

When at least one embodiment of the present disclosure shown in FIG. 5A is working, when the first fourth switch circuit 51 controls to connect the first terminal of the first third resistor R13 and the first column data line DL1, the second fourth switch circuit 52 controls to connect the first terminal of the second third resistor R23 and the second column data line DL2, and the third fourth switch circuit 53 controls to connect the first terminal of the third third resistor R33 and the third column data line DL3, they are in V-Hardware Super Resolution (V-HSR) mode, and there is no need to separately provide data voltages to DL4, DL5 and DL6.

Figure 5B:
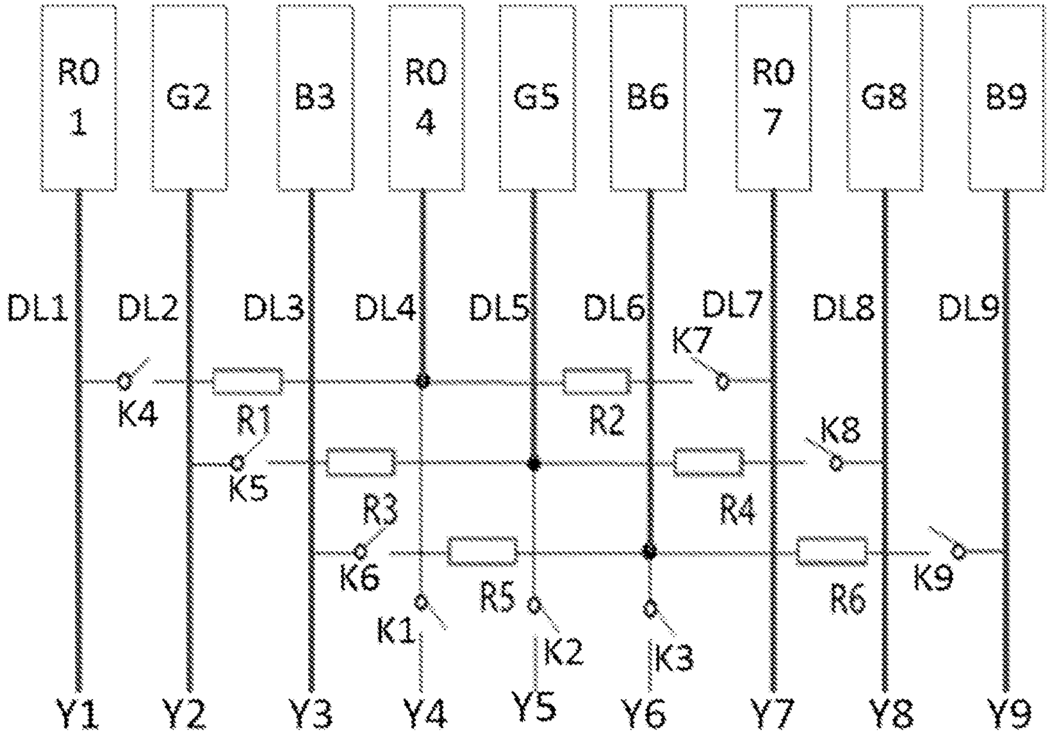
FIG. 5B is a circuit diagram of a data voltage supply circuit according to at least one embodiment of the present disclosure.

As shown in FIG. 5B, the supply circuit P0 includes a first gating circuit and a second gating circuit; the first column of pixels includes the first column of red sub-pixels R01, the second column of green sub-pixels G2, and the third column of blue sub-pixels B3, the fourth column of red sub-pixels R04, the fifth column of green sub-pixels G5, the sixth column of blue sub-pixels B6, the seventh column of red sub-pixels R07, the eighth column of green sub-pixels G8 and the ninth column of blue sub-pixels B9;

The first column of red sub-pixels R01 are electrically connected to the first column data line DL1, the second column of green sub-pixels G2 are electrically connected to the second column data line DL2, and the third column of blue sub-pixels B3 are electrically connected to the third column data line DL3, the fourth column of red sub-pixels R04 is electrically connected to the fourth column data line DL4, the fifth column of green sub-pixels G5 is electrically connected to the fifth column data line DL5, the sixth column of blue sub-pixels B6 is electrically connected to the sixth column data line DL6, the seventh column of red sub-pixel R07 is electrically connected to the seventh column data line DL7, the eighth column of green sub-pixel G8 is electrically connected to the eighth column data line DL8, the ninth column of blue sub-pixel B9 is electrically connected to the ninth column data line DL9;

The first gating circuit includes a first switch K1, a second switch K2 and a third switch K3;

The second gating circuit includes a fourth switch K4, a fifth switch K5, a sixth switch K6, a seventh switch K7, an eighth switch K8, a ninth switch K9, a first resistor R1, a second resistor R2, a third Resistor R3, a fourth resistor R4, a fifth resistor R5 and a sixth resistor R6;

The first data voltage supply terminal Y1 is directly electrically connected to DL1, the second data voltage supply terminal Y2 is directly electrically connected to DL2, the third data voltage supply terminal Y3 is directly electrically connected to DL3, and the seventh data voltage supply terminal Y7 is directly electrically connected to DL7, the eighth data voltage supply terminal Y8 is directly electrically connected to DL8, and the ninth data voltage supply terminal Y9 is directly electrically connected to DL9;

The first terminal of K1 is electrically connected to DL4, and the second terminal of K1 is electrically connected to Y4;

The first terminal of K2 is electrically connected to DL5, and the second terminal of K2 is electrically connected to Y5;

The first terminal of K3 is electrically connected to DL6, and the second terminal of K3 is electrically connected to Y6;

The first terminal of K4 is electrically connected to DL1, and the second terminal of K4 is electrically connected to DL4 through R1;

The first terminal of K5 is electrically connected to DL2, and the second terminal of K5 is electrically connected to DL5 through R3;

The first terminal of K6 is electrically connected to DL3, and the second terminal of K6 is electrically connected to DL6 through R5;

The first terminal of K7 is electrically connected to DL7, and the second terminal of K7 is electrically connected to DL4 through R2;

The first terminal of K8 is electrically connected to DL8, and the second terminal of K8 is electrically connected to DL5 through R4;

The first terminal of K9 is electrically connected to DL9, and the second terminal of K9 is electrically connected to DL6 through R6.

Figure 5C:
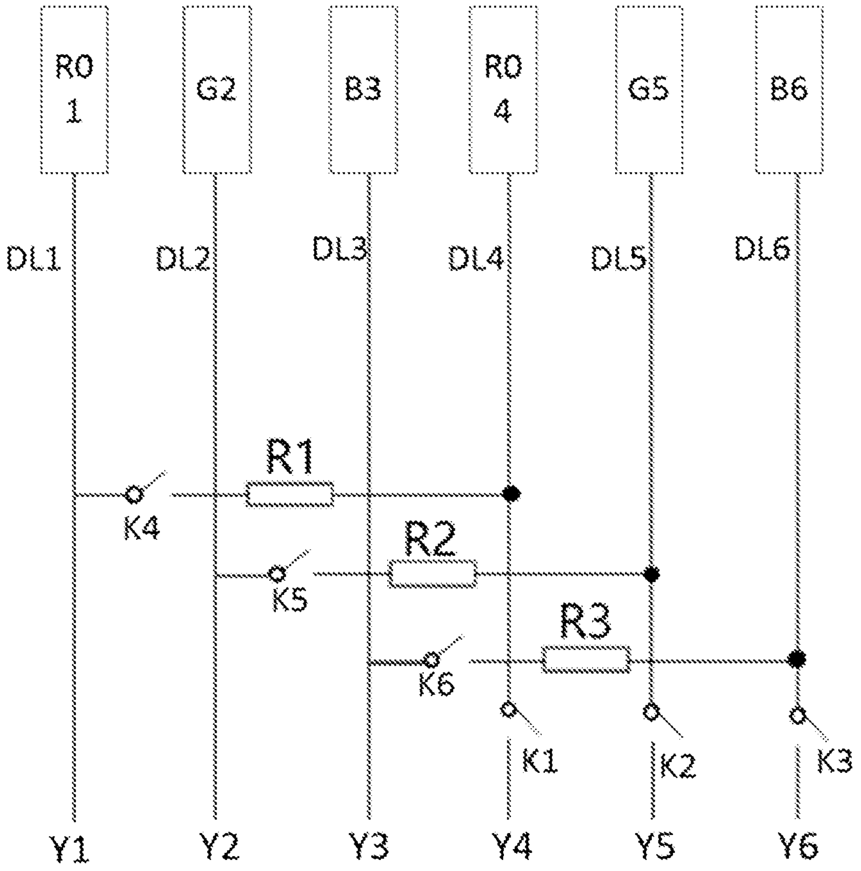
FIG. 5C is a circuit diagram of a data voltage supply circuit according to at least one embodiment of the present disclosure.

As shown in FIG. 5C, the supply circuit P0 includes a first gating circuit and a third gating circuit;

The first column of pixels has the first column of red sub-pixels R01, the second column of green sub-pixels G2, the third column of blue sub-pixels B3, the fourth column of red sub-pixels R04, the fifth column of green sub-pixels G5 and the sixth column of blue sub-pixels B6;

The first column of red sub-pixels R01 are electrically connected to the first column data line DL1, the second column of green sub-pixels G2 are electrically connected to the second column data line DL2, and the third column of blue sub-pixels B3 are electrically connected to the third column data line DL3, the fourth column of red sub-pixels R04 are electrically connected to the fourth column data line DL4, the fifth column of green sub-pixels G5 are electrically connected to the fifth column data line DL5, the sixth column of blue sub-pixels B6 are electrically connected to the sixth column data line DL6;

The first gating circuit includes a first switch K1, a second switch K2 and a third switch K3;

The first terminal of K1 is electrically connected to DL4, and the second terminal of K1 is electrically connected to Y4;

The first terminal of K2 is electrically connected to DL5, and the second terminal of K2 is electrically connected to Y5;

The first terminal of K3 is electrically connected to DL6, and the second terminal of K3 is electrically connected to Y6;

The first data voltage supply terminal Y1 is directly electrically connected to DL1, the second data voltage supply terminal Y2 is directly electrically connected to DL2, and the third data voltage supply terminal Y3 is directly electrically connected to DL3;

The third gating circuit includes a fourth switch K4, a fifth switch K5, a sixth switch K6, a first resistor R1, a second resistor R2 and a third resistor R3;

The first terminal of K4 is electrically connected to DL1, and the second terminal of K4 is electrically connected to DL4 through R1;

The first terminal of K5 is electrically connected to DL2, and the second terminal of K5 is electrically connected to DL5 through R2;

The first terminal of K6 is electrically connected to DL3, and the second terminal of K6 is electrically connected to DL6 through R3.

In at least one embodiment of the present disclosure, the data driver includes at least one data driving circuit; the column of pixels includes three columns of sub-pixels;

The data driving circuit includes N data voltage supply terminals; N is a positive integer;

The ath supply circuit includes the ath first gating circuit and the ath second gating circuit; a is a positive integer;

The first column of sub-pixels included in the (3a−1)th column of pixels is electrically connected to the (6a−2)th column data line, the second column of sub-pixels included in the (3a−1)th column of pixels is electrically connected to the (6a−1)th column data line, and the third column of sub-pixels included in the (3a−1)th column data line is electrically connected to the 6ath column data line;

The first column of sub-pixels included in the (3a−2)th column of pixels is electrically connected to the (6a−5)th column data line, the second column of sub-pixels included in the (3a−2)th column of pixels is electrically connected to the (6a−4)th column data line, and the third column of sub-pixels included in the (3a−2)th column data line is electrically connected to the (6a−3)th column data line;

The first column of sub-pixels included in the 3ath column of pixels is electrically connected to the (6a+1)th column data line, the second column of sub-pixels included in the 3ath column of pixels is electrically connected to the (6a+2)th column data line, and the third column of sub-pixels included in the 3ath column data line is electrically connected to the (6a+3)th column data line;

The ath first gating circuit is respectively connected to the (6a−2)th column data line, the (6a−1)th column data line, the 6ath column data line, the (6a−2)th data voltage supply terminal, and the (6a−1)th data voltage supply terminal, and the 6ath data voltage supply terminal, and is configured to control to connect or disconnect the (6a−2)th column data line and the (6a−2)th data voltage supply terminal, and the (6a−1)th column data line and the (6a−1)th data voltage supply terminal, and 6ath column data line and the 6ath data voltage supply terminal;

The ath second gating circuit is respectively electrically connected to the (6a−5)th column data line, the (6a−4)th column data line, the (6a−3)th column data line, the (6a+1)th column data line, the (6a+2)th column data line and the (6a+3)th column data line, the (6a−2)th column data line, the (6a−1)th column of data line and the 6ath column data line, and is configured to control the data voltage received by the (6a−2)th column data line according to the data voltage received by the (6a−5)th column data line and the data voltage received by the (6a+1)th column data line, control the data voltage received by the the (6a−1)th column data line according to the data voltage received by the (6a−4)th column data line and the data voltage received by the (6a+2)th column data line, control the data voltage received by the 6ath column data line according to the data voltage received by the (6a−3)th column data line and the data voltage received by the (6a+3)th column data line;

The (6a−5)th column data line is directly electrically connected to the (6a−5)th data voltage supply terminal, the (6a−4)th column data line is directly electrically connected to the (6a−4)th data voltage supply terminal, the (6a−3)th column data line is directly electrically connected to the (6a−3)th data voltage supply terminal, the (6a+1)th column data line is directly electrically connected to the (6a+1)th data voltage supply terminal, the (6a+2)th column data line is directly electrically connected to the (6a+2)th data voltage supply terminal, the (6a+3)th column data line is directly electrically connected to the (6a+3)th data voltage supply terminal.

In specific implementation, the data voltage supply circuit may include a plurality of supply circuits;

Each supply circuit includes a first gating circuit and a second gating circuit;

The ath first gating circuit controls to connect or disconnect between the (6a−2)th column data line and the (6a−2)th data voltage supply terminal, and controls to connect or disconnect the (6a−1)th column data line and the (6a−1)th data voltage supply terminal, and controls to connect or disconnect the 6ath column data line and the 6ath data voltage supply terminal;

The ath second gating circuit controls the data voltage received by the (6a−2)th column data line according to the data voltage received by the (6a−5)th column data line and the data voltage received by the (6a+1)th column data line, control the data voltage received by the (6a−1)th column data line according to the data voltage received by the (6a−4)th column data line and the data voltage received by the (6a+2)th column data line, control the data voltage received by the 6ath column data line according to the data voltage received by the (6a−3)th column data line and the data voltage received by the (6a+3)th column data line.

Optional, N is mulitple of 6;

The data voltage supply circuit includes a fourth gating circuit;

The fourth gating circuit is respectively connected to the Nth column data line, the (N−1)th column data line, the (N−2)th column data line, the (N−3)th column data line, the (N−4)th column data line and the (N−5)th column data line, configured to control to connect or disconnect the Nth column data line and the (N−3)th column data line, and control to connect or disconnect the (N−1)th column data line and the (N−4)th column data line, and control to connect or disconnect the (N−2)th column data line and the (N−5)th column data line.

In specific implementation, when the number N of data voltage supply terminals included in the data driving circuit is multiple of 6, the data voltages provided by the last three data voltage supply terminals included in the data driving circuit cannot be provided through other data voltage supply terminals, so at least one embodiment of the present disclosure provides a fourth gating circuit; the fourth gating circuit controls to connect or disconnect the Nth column data line and the (N−3)th column data line, control to connect or disconnect the (N−1)th column data line and the (N−4)th column data line, and controls to connect or disconnect the (N−2)th column data line and the (N−5)th column data line, so that the Nth column data line can share the data voltage on the (N−3)th column data line, the (N−1)th column data line can share the data voltage on the (N−4)th column data line, and the (N−2)th column data line can share the data voltage on the (N−5)th column data line.

Figure 6:
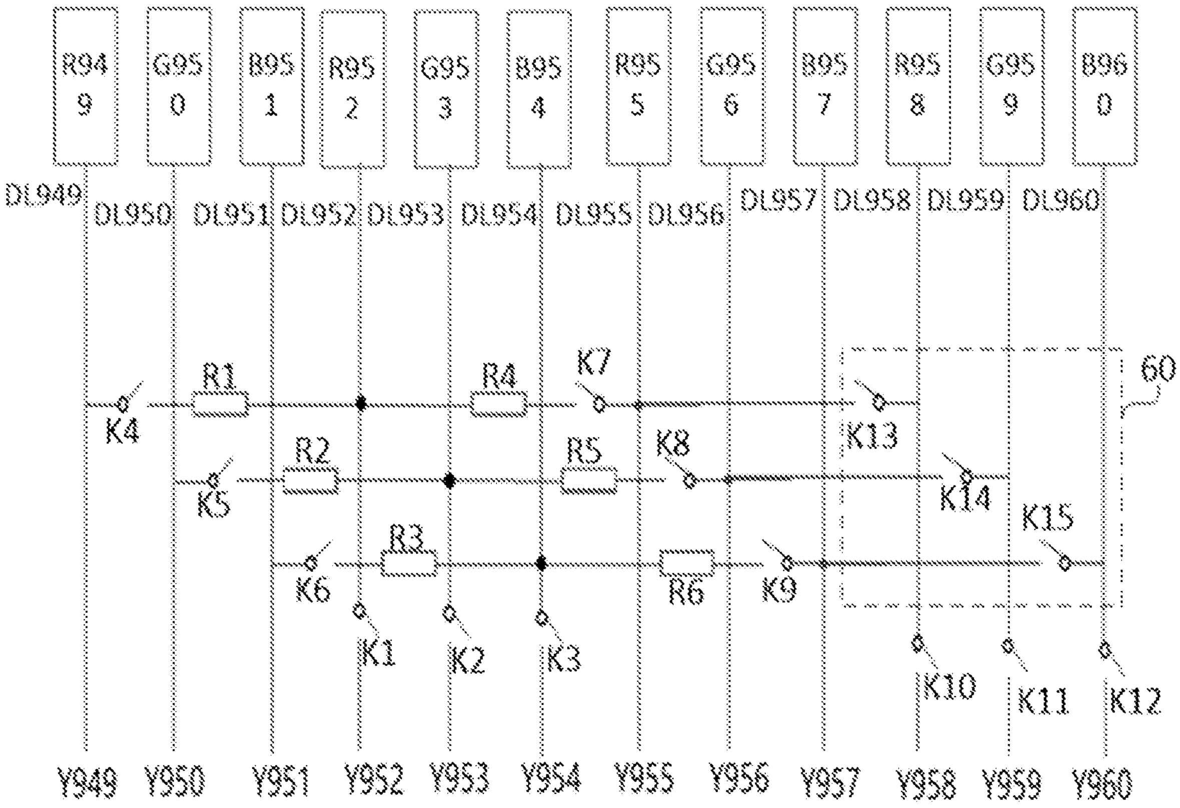
FIG. 6 is a circuit diagram of a data voltage supply circuit according to at least one embodiment of the present disclosure.

As shown in FIG. 6, Y949 is the 949th data voltage supply terminal, Y950 is the 950th data voltage supply terminal, Y951 is the 951st data voltage supply terminal, and Y952 is the 952nd data voltage supply terminal, Y953 is the 953rd data voltage supply terminal, Y954 is the 954th data voltage supply terminal, Y955 is the 955th data voltage supply terminal, Y956 is the 956th data voltage supply terminal, Y957 is the 957th data voltage supply terminal, Y958 is the 958th data voltage supply terminal, Y959 is the 959th data voltage supply terminal, and Y960 is the 960th data voltage supply terminal;

DL949 is the 949th column data line, DL950 is the 950th column data line, DL951 is the 951st column data line, DL952 is the 952nd column data line, DL953 is the 953th column data line, DL954 is the 954th column data line, DL955 is the 955th column data line, DL956 is the 956th column data line, DL957 is the 957th column data line, DL958 is the 958th column data line, DL959 is the 959th column data line, and DL960 is the 960th column data line;

R949 is the 949th column of red sub-pixels, G950 is the 950th column of green sub-pixels, B951 is the 951st column of blue sub-pixels, R952 is the 952nd column of red sub-pixels, G953 is the 953rd column of green sub-pixels, B954 is the 954th column of blue sub-pixels, R955 is the 955th column of red sub-pixels, G956 is the 956th column of green sub-pixels, B957 is the 957th column of blue sub-pixels, R958 is the 958th column of red sub-pixels, G959 is the 959th column of green sub-pixels, and B960 is the 960th column of blue sub-pixels;

In at least one embodiment shown in FIG. 6, N is equal to 960;

The data voltage supply circuit includes a fourth gating circuit 60;

The fourth gating circuit 60 is connected to the 960th column data line DL960, the 959th column data line DL959, the 958th column data line DL958, the 957th column data line DL957, the 956th column data line DL956 and the 955th column data line respectively, and is configured to control to connect or disconnect the 960th column data line DL960 and the 957th column data line DL957, and control to connect or disconnect the 959th column data line DL959 and the 956th column data line DL956, control to connect or disconnect the 958th column data line DL958 and the 955th column data line DL955.

In FIG. 6, a first resistor R1, a second resistor R2, a third resistor R3, a fourth resistor R4, a fifth resistor R5, a sixth resistor R6, a first switch K1, a second switch K2, a third switch K3, a fourth switch K4, a fifth switch K5, a sixth switch K6, a seventh switch K7, an eighth switch K8, a ninth switch K9, a tenth switch K10, an eleventh switch K11 and a twelfth switch K12;

Y952 is electrically connected to DL952 through K1, Y953 is electrically connected to DL953 through K2, and Y954 is electrically connected to DL954 through K3;

Y949 is electrically connected to DL949, R949 is electrically connected to DL949; Y949 is electrically connected to DL952 through K4 and R1;

Y950 is electrically connected to DL950, G950 is electrically connected to DL950, and Y950 is electrically connected to DL953 through K5 and R2;

Y951 is electrically connected to DL951, B951 is electrically connected to DL951, and Y951 is electrically connected to DL954 through K6 and R3;

R952 is electrically connected to DL952, and DL952 is electrically connected to DL955 through K7 and R4;

G953 is electrically connected to DL953, and DL953 is electrically connected to DL956 through K8 and R5;

B954 is electrically connected to DL954, and DL954 is electrically connected to DL957 through K9 and R6;

Y958 is electrically connected to DL958 through K10, Y959 is electrically connected to DL959 through K11, and Y960 is electrically connected to DL960 through K12;

The fourth gating circuit 60 includes a thirteenth switch K13, a fourteenth switch K14, and a fifteenth switch K15;

The first terminal of K13 is electrically connected to DL955, and the second terminal of K13 is electrically connected to DL958;

The first terminal of K14 is electrically connected to DL956, and the second terminal of K13 is electrically connected to DL959;

The first terminal of K15 is electrically connected to DL957, and the second terminal of K13 is electrically connected to DL960.

When at least one embodiment shown in FIG. 6 of the present disclosure is working, the fourth gating circuit 60 can control to connect the 960th column data line DL960 and the 957th column data line DL957, and control to connect the 959th column data line DL959 and the 956th column data line DL956, and control to connect the 958th column data line DL958 and the 955th column data line DL955, so that the data voltage received by DL960 is the same as the data voltage received by DL957, the data voltage received by DL959 is the same as the data voltage received by DL956, the data voltage received by DL958 is the same as the data voltage received by DL955.

Optionally, N is multiple of 6, and the data driver includes B data driver circuits; B is an integer greater than 1;

The bth data driving circuit is electrically connected to the bth group of N columns data lines, the (b+1)th data circuit is electrically connected to the (b+1)th group of N columns data lines, b is a positive integer, and b+1 is less than or equal to B;

The data voltage supply circuit includes a fifth gating circuit;

The fifth gating circuit is respectively connected to the (N−5)th data line in the bth group of N columns data lines, the (N−4)th data line in the bth group of N columns data lines, and the (N−3)th data line in the bth group of N columns data lines, the (N−2)th data line in the bth group of N columns data lines, the (N−1)th data line in the bth group of N columns data lines, the Nth data line in the bth group of N columns data lines, the first column data line in the (b+1)th group of N columns data lines, the second column data line in the (b+1)th group of N columns data lines, and the third column data line in the (b+1)th group of N columns data lines, and is configured to control the data voltage received by the (N−2)th data line in the bth group of N columns data lines according to the data voltage received by the (N−5)th data line in the bth group of N columns data lines and the first column data line in the (b+1)th group of N columns data lines, control the data voltage received by the (N−1)th data line in the bth group of N columns data lines according to the data voltage received by the (N−4)th data line in the bth group of N columns data lines, and the data voltage received by the second column data line in the (b+1)th group of N columns data lines, control the data voltage received by the Nth data line in the bth group of N columns data lines according to the data voltage received by the (N−3)th data line in the bth group of N columns data lines and the data voltage received by the third column data line in the (b+1)th group of N columns data lines.

In specific implementation, when the data driver includes a plurality of data driving circuits, and when the number of data voltage supply terminals included in the data driving circuit is multiple of 6, the data voltage provided by the last three data voltage supply terminals included in the data driving circuit is obtained according to the sixth data voltage supply terminal to the last to the fourth data voltage supply terminal to the last included in a data driving circuit and the first three data voltage supply terminals included in another data driving circuit.

Figure 7:
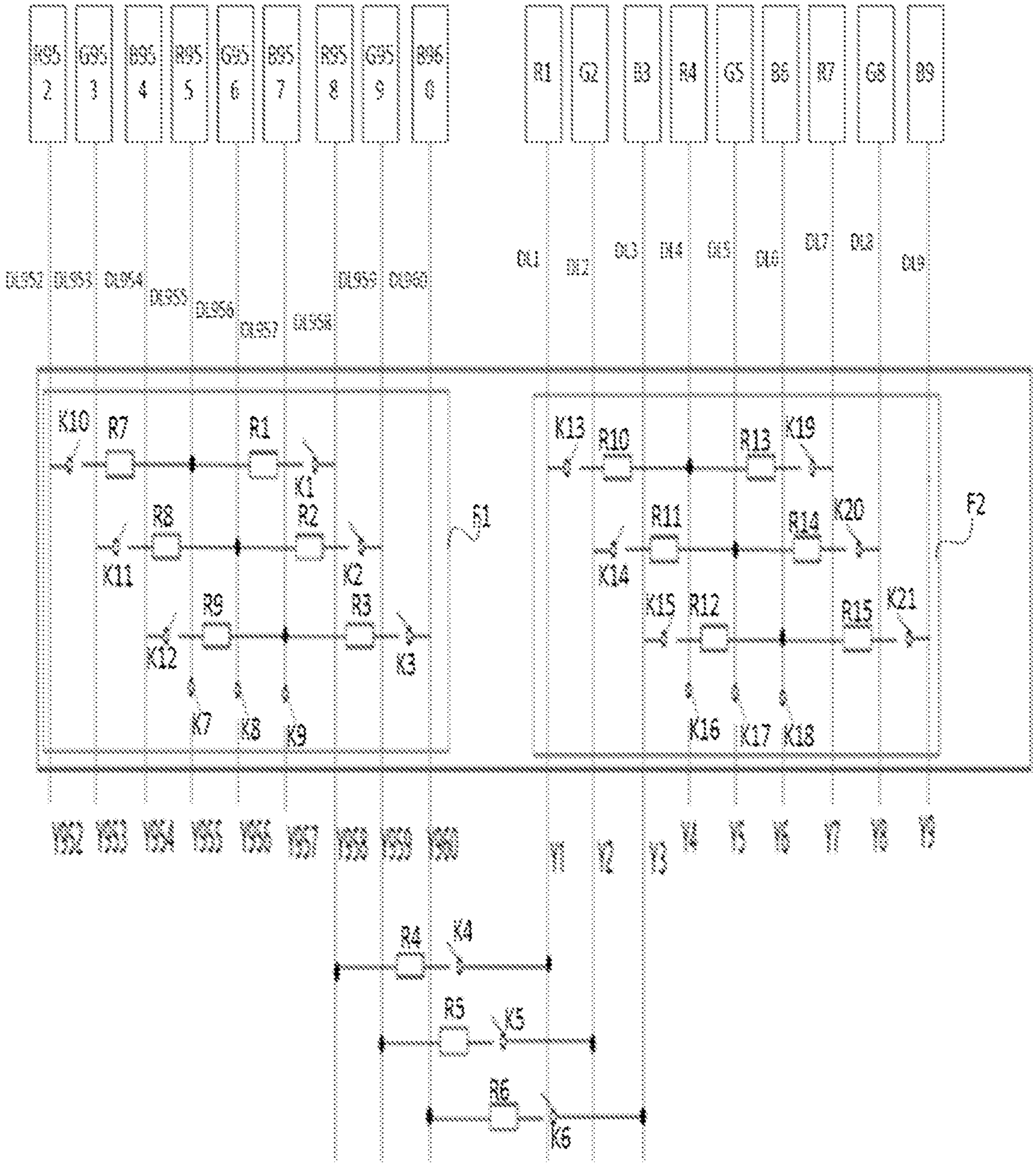
FIG. 7 is a circuit diagram of a data voltage supply circuit according to at least one embodiment of the present disclosure.

In FIG. 7, F1 is the first data driving circuit, and F2 is the second data driving circuit;

Y952 is the 952nd data voltage supply terminal of the first data driving circuit, Y953 is the 953rd data voltage supply terminal of the first data driving circuit, and Y954 is the 954th data voltage supply terminal of the first data driving circuit, Y955 is the 955th data voltage supply terminal of the first data driving circuit, Y956 is the 956th data voltage supply terminal of the first data driving circuit, Y957 is the 957th data voltage supply terminal of the first data driving circuit, Y958 is the 958th data voltage supply terminal of the first data driving circuit, Y959 is the 959th data voltage supply terminal of the first data driving circuit, Y960 is the 960th data voltage supply terminal of the first data driving circuit;

DL952 is the 952nd column data line electrically connected to the first data driving circuit, DL953 is the 953rd column data line electrically connected to the first data driving circuit, DL954 is the 954th column data line electrically connected to the first data driving circuit, DL955 is the 955th column data line electrically connected to the first data driving circuit, DL956 is the 956th column data line electrically connected to the first data driving circuit, DL957 is the 957th column data line electrically connected to the first data driving circuit, DL958 is the 958th column data line electrically connected to the first data driving circuit, DL 959 is the 959th column data line electrically connected to the first data driving circuit, and DL960 is the 960th column data line electrically connected to the first data driving circuit;

Y1 is the first data voltage supply terminal of the second data driving circuit, Y2 is the second data voltage supply terminal of the second data driving circuit, Y3 is the third data voltage supply terminal of the second data driving circuit, Y4 is the fourth data voltage supply terminal of the second data driving circuit, Y5 is the fifth data voltage supply terminal of the second data driving circuit, Y6 is the sixth data voltage supply terminal of the second data driving circuit, Y7 is the seventh data voltage supply terminal of the second data driving circuit, Y8 is the eighth data voltage supply terminal of the second data driving circuit, and Y9 is the ninth data voltage supply terminal of the second data driving circuit;

DL1 is the first column data line electrically connected to the second data driving circuit, DL2 is the second column data line electrically connected to the second data driving circuit, DL3 is the third column data line electrically connected to the second data driving circuit, DL4 is the fourth column data line electrically connected to the second data driving circuit, DL5 is the fifth column data line electrically connected to the second data driving circuit, DL6 is the sixth column data line electrically connected to the second data driving circuit, DL7 is the seventh column data line electrically connected to the second data driving circuit, and DL8 is the eighth column data line electrically connected to the second data driving circuit, DL9 is the ninth column data line electrically connected to the second data driving circuit;

R952 is a column of red sub-pixels electrically connected to DL952, G953 is a column of green sub-pixels electrically connected to DL953, B954 is a column of blue sub-pixels electrically connected to DL954, R955 is a column of red sub-pixels electrically connected to DL955, G956 is a column of green sub-pixels electrically connected to DL956, B957 is a column of blue sub-pixels electrically connected to DL957, R958 is a column of red sub-pixels electrically connected to DL958, G959 is a column of green sub-pixels electrically connected to DL959, and B960 is a column of blue sub-pixels electrically connected to DL960;

R1 is a column of red sub-pixels electrically connected to DL1, G2 is a column of green sub-pixels electrically connected to DL2, B3 is a column of blue sub-pixels electrically connected to DL3, and $R^{04}$ is a column of red sub-pixels electrically connected to DL4, G5 is a column of green sub-pixels electrically connected to DL5, B6 is a column of blue sub-pixels electrically connected to DL6, and $R^{07}$ is a column of red sub-pixels electrically connected to DL7, G8 is a column of green sub-pixels electrically connected to DL8, and B9 is a column of blue sub-pixels electrically connected to DL9;

K1 is the first switch, K2 is the second switch, K3 is the third switch, K4 is the fourth switch, K5 is the fifth switch, K6 is the sixth switch, K7 is the seventh switch, K8 is the eighth switch, K9 is the ninth switch, K10 is the tenth switch, K11 is the eleventh switch, K12 is the twelfth switch, K13 is the thirteenth switch, K14 is the fourteenth switch, K15 is the fifteenth switch, K16 is the sixteenth switch, K17 is the seventeenth switch, K18 is the eighteenth switch, K19 is the nineteenth switch, $K_2O$ is the twentieth switch, and K21 is the twenty-first switch;

R1 is the first resistor, R2 is the second resistor, R3 is the third resistor, R4 is the fourth resistor, R5 is the fifth resistor, R6 is the sixth resistor, R7 is the seventh resistor, R8 is the eighth resistor, R9 is the ninth resistor, R10 is the tenth resistor, R11 is the eleventh resistor, R12 is the twelfth resistor; R13 is the thirteenth resistor; R14 is the fourteenth resistor; R15 is the fifteenth resistor;

Y958 is electrically connected to Y955 through K1 and R1, Y959 is electrically connected to Y956 through K2 and R2, and Y960 is electrically connected to Y957 through K3 and R3;

Y958 is electrically connected to Y1 through R4 and K4, Y959 is electrically connected to Y2 through R5 and K5, and Y960 is electrically connected to Y3 through R6 and K6;

Y955 is electrically connected to DL955 through K7, Y956 is electrically connected to DL956 through K8, and Y957 is electrically connected to DL957 through K9;

DL955 is electrically connected to Y952 through R7 and K10, DL956 is electrically connected to Y953 through R8 and K11, DL957 is electrically connected to Y954 through R9 and K12;

Y1 is electrically connected to Y4 through K13 and R10, Y2 is electrically connected to Y5 through K14 and R11, and $Y^3$ is electrically connected to Y6 through K15 and R12;

DL4 is electrically connected to Y4 through K16, DL5 is electrically connected to Y5 through K17, and DL6 is electrically connected to Y6 through K18;

Y7 is electrically connected to Y4 through K19 and R13, Y8 is electrically connected to Y5 through $K_2O$ and R14, and Y9 is electrically connected to Y6 through K21 and R15;

Y958 is directly electrically connected to DL958, Y959 is directly electrically connected to DL959, Y960 is directly electrically connected to DL960, Y1 is directly electrically connected to DL1, Y2 is directly electrically connected to DL2, and $Y^3$ is directly electrically connected to DL3.

When at least one embodiment shown in FIG. 7 of the present disclosure is working, when K1, K2, K3, K4, K5 and K6 are all turned off, Y958 is connected to Y955 through R1, Y959 is connected to Y956 through R2, and Y960 is connected to Y957 through R3, Y958 is connected to Y1 through R4, Y959 is connected to Y2 through R5, and Y960 is connected to Y3 through R6. The data voltage provided by Y958 can be controlled according to the data voltage provided by Y955 and the data voltage provided by Y1. The data voltage provided by Y959 can be controlled according to the data voltage provided by Y956 and the data voltage provided by Y2, and the data voltage provided by Y960 can be controlled according to the data voltage provided by Y957 and the data voltage provided by Y3.

In at least one embodiment of the present disclosure, the data driver includes at least one data driving circuit; the column of pixels includes three columns of sub-pixels;

The data driving circuit includes N data voltage supply terminals; N is a positive integer;

The ath supply circuit includes the ath first gating circuit and the ath third gating circuit; a is a positive integer;

The ath first gating circuit is respectively connected to the (6a−2)th column data line, the (6a−1)th column data line, the 6ath column data line, the (6a−2)th data voltage supply terminal, the (6a−1)th data voltage supply terminal, and the 6ath data voltage supply terminal, and is configured to control to connect or disconnect the (6a−2)th column data line and the (6a−2)th data voltage supply terminal, and control to connect or disconnect the (6a−1)th column data line and the (6a−1)th data voltage supply terminal, and control to connect or disconnect the 6ath column data line and the 6ath data voltage supply terminal;

The ath third gating circuit is respectively connected to the (6a−5)th column data line, the (6a−4)th column data line, the (6a−3)th column data line, the (6a−2)th column data line, the (6a−1)th column data line and the 6ath column data line, and is configured to control the data voltage on the (6a−2)th column data line according to the data voltage of the (6a−5)th column data line, control the data voltage on the (6a−1)th column data line according to the data voltage of the (6a−4)th column data line and control the data voltage on the 6ath column data line according to the data voltage of the (6a−3)th column data line.

In specific implementation, the data driver may include at least one data driving circuit, the ath supply circuit includes an ath first gating circuit and an ath third gating circuit, and the ath first gating circuit controls to connect or disconnect the (6a−2)th column data line and the (6a−2)th data voltage supply terminal, controls to connect or disconnect the (6a−1)th column data line and the (6a−1)th data voltage supply terminal, and controls to connect or disconnect the bath column data line and the 6ath data voltage supply terminal; the ath third gating circuit controls the data voltage on the (6a−2)th column data line according to the data voltage on the (6a−5)th column data line, controls the data voltage on the (6a−1)th column data line according to the data voltage on the (6a−4)th column data line, and controls the data voltage on the 6ath column data line according to the data voltage on the (6a−3)th column data line.

Optionally, the mth first switching circuit includes the mth first switching transistor;

A gate electrode of the mth first switching transistor is electrically connected to the first control voltage terminal, a first electrode of the mth first switching transistor is electrically connected to the mth data voltage supply terminal, and a second electrode of the mth first switching transistor is electrically connected to the mth data line;

The data voltage supply circuit includes a first control circuit;

The first control circuit is configured to provide a first control voltage to the first control voltage terminal to control the mth first switching transistor to be turned on or off.

Optionally, the mth second switching circuit includes an mth second switching transistor, and the mth third switching circuit includes an mth third switching transistor;

A gate electrode of the mth second switching transistor is electrically connected to the second control voltage terminal, and a first electrode of the mth second switching transistor is connected to the mth column data in the first group of M columns data lines, a second electrode of the mth second switching transistor is electrically connected to the first terminal of the mth first resistor;

A gate electrode of the mth third switching transistor is electrically connected to the second control voltage terminal, and a first electrode of the mth third switching transistor is electrically connected to the second terminal of the mth second resistor, a second electrode of the mth third switching transistor is electrically connected to the mth column data line in the second group of M columns data lines;

The data voltage supply circuit includes a second control circuit;

The second control circuit is configured to provide a second control voltage to the second control voltage terminal to control the mth second switching transistor to be turned on or off, and to control the mth third switching transistor to be turned on or off.

Figure 8:
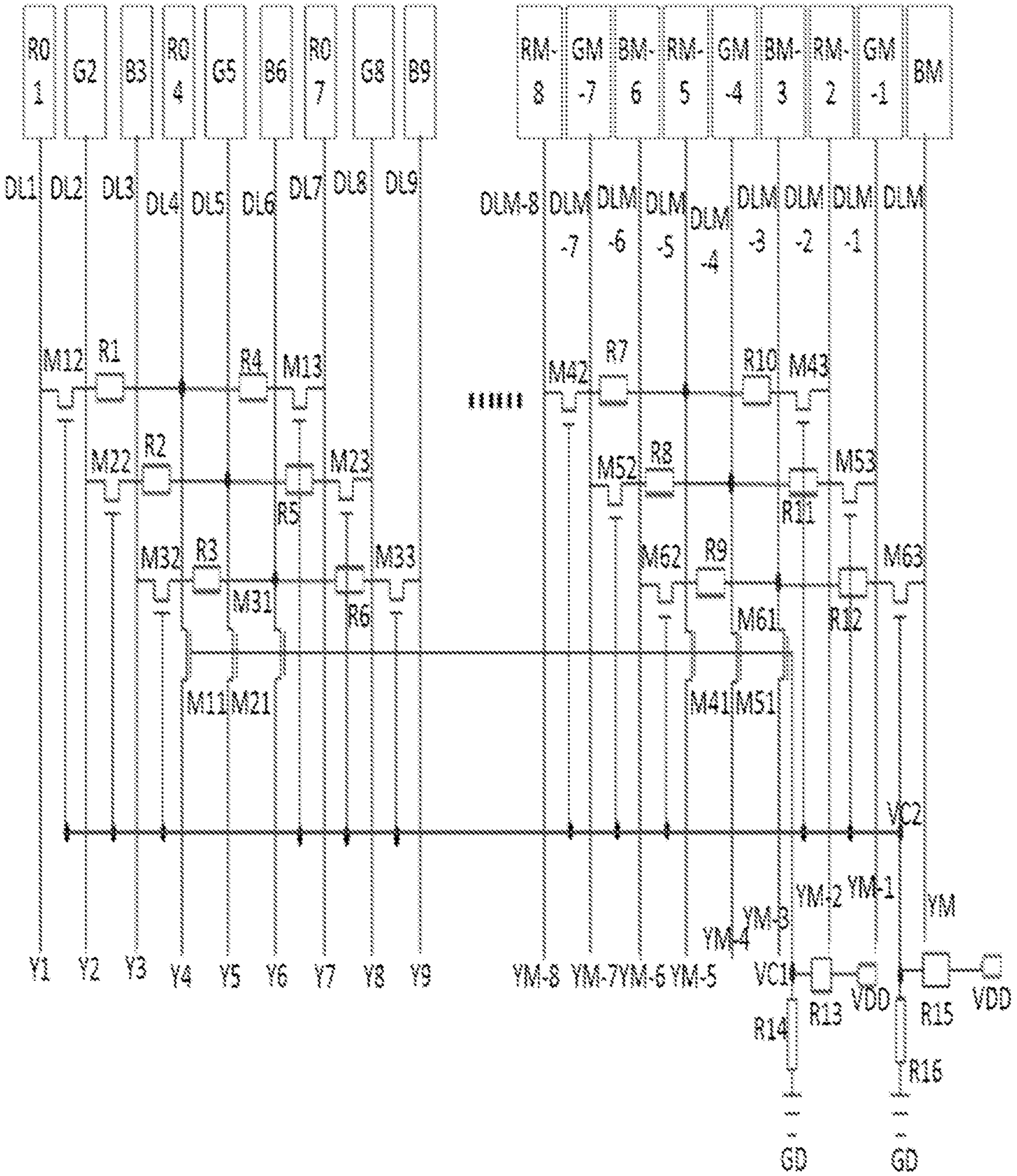
FIG. 8 is a circuit diagram of a data voltage supply circuit according to at least one embodiment of the present disclosure.

As shown in FIG. 8, DL1 is the first column data line, DL2 is the second column data line, DL3 is the third column data line, DL4 is the fourth column data line, DL5 is the fifth column data line, DL6 is the sixth column data line, DL7 is the seventh column data line, DL8 is the eighth column data line, DL9 is the ninth column data line;

DLM-8 is the (M-8)th column data line, DLM-7 is the (M-7)th column data line, DLM-6 is the (M-6)th column data line, DLM-5 is the (M-5)th column data line, DLM-4 is the (M-4)th column data line, DLM-3 is the (M-3)th column data line, DLM-2 is the (M-2)th column data line, DLM-1 is the (M-1)th column data line, DLM is the Mth column data line; M is a positive integer;

In FIG. 8, M11 is the first first switching transistor, M21 is the second first switching transistor, M31 is the third first switching transistor, M41 is the fourth first switching transistor, M51 is the fifth first switching transistor, and M61 is the sixth first switching transistor;

M12 is the first second switching transistor, M22 is the second second switching transistor, M32 is the third second switching transistor, M42 is the fourth second switch transistor, M52 is the fifth second switching transistor, and t M62 is the sixth second switching transistor;

M13 is the first third switching transistor, M23 is the second third switching transistor, M33 is the third third switching transistor, M43 is the fourth third switch transistor, M53 is the fifth third switching transistor, and M63 is the sixth third switching transistor;

R1 is the first resistor, R2 is the second resistor, R3 is the third resistor, R4 is the fourth resistor, R5 is the fifth resistor, R6 is the sixth resistor, R7 is the seventh resistor, R8 is the eighth resistor, R9 is the ninth resistor, R10 is the tenth resistor, R11 is the eleventh resistor, R12 is the twelfth resistor;

R13 is the thirteenth resistor, R14 is the fourteenth resistor, R15 is the fifteenth resistor, and R16 is the sixteenth resistor;

Y1 is the first data voltage supply terminal, Y2 is the second data voltage supply terminal, Y3 is the third data voltage supply terminal, Y4 is the fourth data voltage supply terminal, Y5 is the fifth data voltage supply terminal, Y6 is the sixth data voltage supply terminal, Y7 is the seventh data voltage supply terminal, Y8 is the eighth data voltage supply terminal, and Y9 is the ninth data voltage supply terminal;

YM-8 is the (M-8)th data voltage supply terminal, YM-7 is the (M-7)th data voltage supply terminal, YM-6 is the (M-6)th data voltage supply terminal, YM-5 is the (M-5)th data voltage supply terminal, YM-4 is the (M-4)th data voltage supply terminal, YM-3 is the (M-3)th data voltage supply terminal, and the YM-2 is the (M-2)th data voltage supply terminal, YM-1 is the (M-1)th data voltage supply terminal, and YM is the Mth data voltage supply terminal;

R01 is the first column of red sub-pixels, G2 is the second column of green sub-pixels, B3 is the third column of blue sub-pixels, R04 is the fourth column of red sub-pixels, G5 is the fifth column of green sub-pixels, B6 is the sixth column of blue sub-pixels, R07 is the seventh column of red sub-pixels, G8 is the eighth column of green sub-pixels, B9 is the ninth column of blue sub-pixels;

RM-8 is the (M-8)th column of red sub-pixels, GM-7 is the (M-7)th column of green sub-pixels, BM-6 is the (M-6)th column of blue sub-pixels, RM-5 is the (M-5)th column of red sub-pixels, GM-4 is the (M-4)th column of green sub-pixels, BM-3 is the (M-3)th column of blue sub-pixels, and RM-2 is the (M-2)th column of red sub-pixels, GM-1 is the (M-1)th column of green sub-pixels, and BM is the Mth column of blue sub-pixels;

The gate electrodes of M11, M21, M31, M41, M51 and M61 are all electrically connected to the first control voltage terminal VC1;

The source electrode of M11 is electrically connected to Y4, and the drain electrode of M11 is electrically connected to DL4;

The source electrode of M21 is electrically connected to Y5, and the drain electrode of M21 is electrically connected to DL5;

The source electrode of M31 is electrically connected to Y6, and the drain electrode of M31 is electrically connected to DL6;

The source electrode of M41 is electrically connected to YM-5, and the drain electrode of M41 is electrically connected to DLM-5;

The source electrode of M51 is electrically connected to YM-4, and the drain electrode of M51 is electrically connected to DLM-4;

The source electrode of M61 is electrically connected to YM-3, and the drain electrode of M61 is electrically connected to DLM-3;

The gate electrode of M12, the gate electrode of M22, the gate electrode of M32, the gate electrode of M42, the gate electrode of M52, the gate electrode of M62, the gate electrode of M13, the gate electrode of M23, the gate electrode of M33, the gate electrode of M43, the gate electrodes of M53 and M63 are both electrically connected to the second control voltage terminal VC2;

The source electrode of M12 is electrically connected to Y1, and the drain electrode of M12 is electrically connected to DL4 through R1;

Y1 is directly electrically connected to DL1;

The source electrode of M22 is electrically connected to Y2, and the drain electrode of M22 is electrically connected to DL5 through R2;

Y2 is directly electrically connected to DL2;

The source electrode of M32 is electrically connected to Y3, and the drain electrode of M32 is electrically connected to DL6 through R3;

Y3 is directly electrically connected to DL3;

The source electrode of M13 is electrically connected to DL4 through R4, and the drain electrode of M13 is electrically connected to Y7;

Y7 is directly electrically connected to DL7;

The source electrode of M23 is electrically connected to DL5 through R5, and the drain electrode of M23 is electrically connected to Y8;

Y8 is directly electrically connected to DL8;

The source electrode of M33 is electrically connected to DL6 through R6, and the drain electrode of M33 is electrically connected to Y9;

Y9 is directly electrically connected to DL9;

The source electrode of M42 is electrically connected to YM-8, and the drain electrode of M42 is electrically connected to DLM-5 through R7;

YM-8 is directly electrically connected to DLM-8;

The source electrode of M52 is electrically connected to YM-7, and the drain electrode of M52 is electrically connected to DLM-4 through R8;

YM-7 is directly electrically connected to DLM-7;

The source electrode of M62 is electrically connected to YM-6, and the drain electrode of M62 is electrically connected to DLM-3 through R9;

YM-6 is directly electrically connected to DLM-6;

The source electrode of M43 is electrically connected to DLM-5 through R10, and the drain electrode of M43 is electrically connected to YM-2;

YM-2 is directly electrically connected to DLM-2;

The source electrode of M53 is electrically connected to DLM-4 through

R11, and the drain electrode of M53 is electrically connected to YM-1;

YM-1 is directly electrically connected to DLM-1;

The source electrode of M63 is electrically connected to R12 and DLM-3, and the drain electrode of M63 is electrically connected to YM;

YM is directly electrically connected to DLM.

When at least one embodiment shown in FIG. 8 of the present disclosure is working, the on-off of each transistor can be controlled through hardware gating, wherein R13-R16 can be arranged on the circuit board;

When R13 and R14 are installed, that is, when R13 and R14 are enabled, the high voltage terminal VDD is electrically connected to the first control voltage terminal VC1 through R13, and the first control voltage terminal VC1 is electrically connected to the ground terminal GD through R14, M11, M21, M31, M41, M51 and M61 are turned on and in the normal data voltage supply mode;

When R15 and R16 are installed, that is, when R15 and R16 are enabled, the high voltage terminal VDD is electrically connected to the second control voltage terminal VC2 through R15, and the second control voltage terminal VC2 is electrically connected to the ground terminal GD through R16. M12, M22, M32, M42, M52, M62, M13, M23, M33, M43, M53 and M63 are all turned on and in V-HSR mode.

In at least one embodiment shown in FIG. 8, all transistors may be n-type transistors, but are not limited to this.

Figure 9:
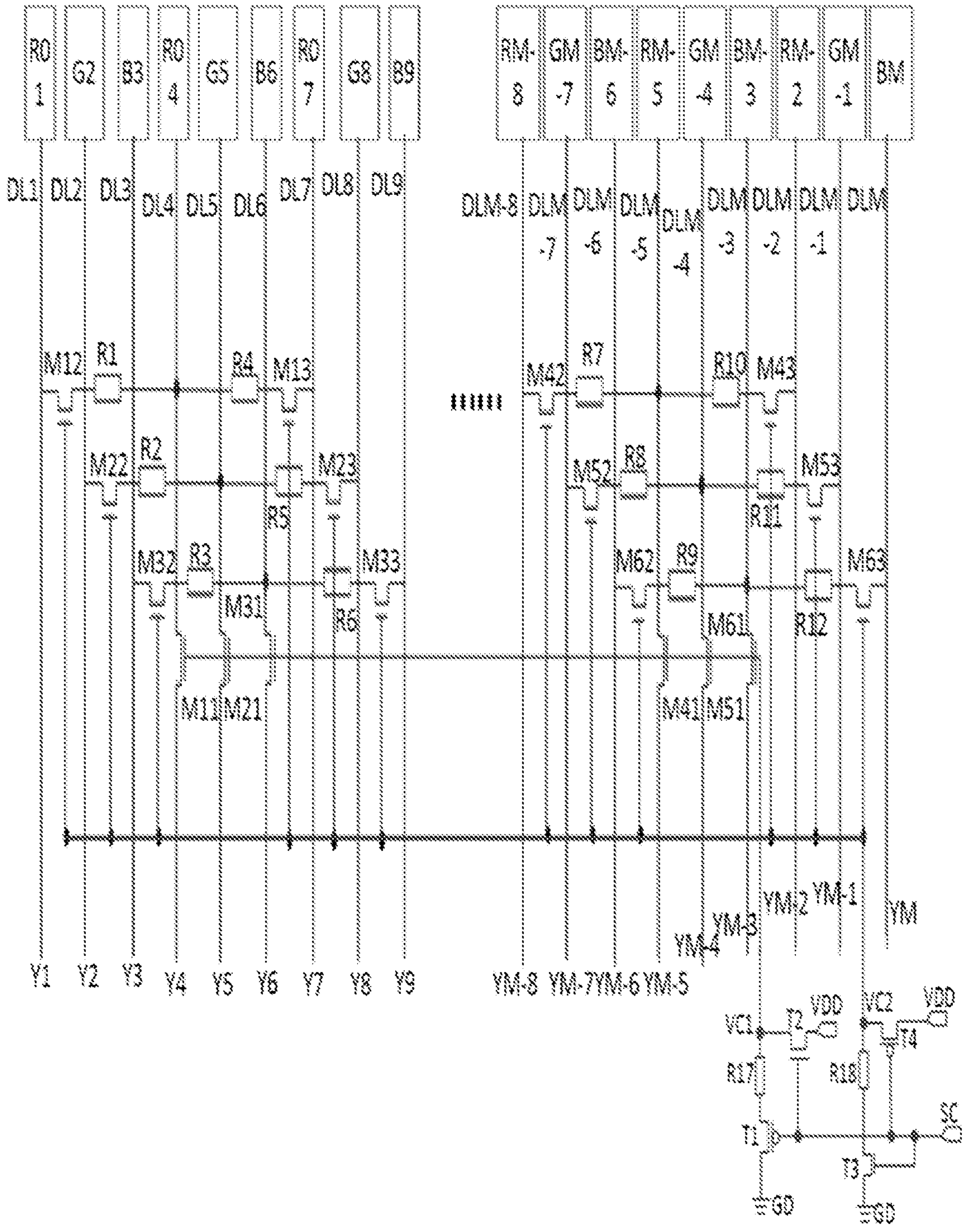
FIG. 9 is a circuit diagram of a data voltage supply circuit according to at least one embodiment of the present disclosure.

The difference between at least one embodiment shown in FIG. 9 and at least one embodiment shown in FIG. 8 is that: R13, R14, R15 and *R*16 are not included;

In at least one embodiment shown in FIG. 9, the first control circuit includes a first control transistor T1, a second control transistor T2 and a seventeenth resistor R17, and the second control circuit includes a third control transistor T3, a fourth control transistor T4 and an eighteenth resistor R18;

The gate electrode of T1 is electrically connected to the control signal terminal SC, the source electrode of T1 is electrically connected to the first control voltage terminal VC1 through R17, and the drain electrode of T1 is electrically connected to the ground terminal GD;

The gate electrode of T2 is electrically connected to the control signal terminal SC, the source electrode of T2 is electrically connected to the high voltage terminal VDD, and the drain electrode of T2 is electrically connected to the first control voltage terminal VC1;

T1 is a p-type transistor, and T2 is an n-type transistor;

The gate electrode of T3 is electrically connected to the control signal terminal SC, the source electrode of T3 is electrically connected to the second control voltage terminal VC2 through R18, and the drain electrode of T3 is electrically connected to the ground terminal GD;

The gate electrode of T4 is electrically connected to the control signal terminal SC, the source electrode of T4 is electrically connected to the high voltage terminal VDD, and the drain electrode of T4 is electrically connected to the second control voltage terminal VC2;

T3 is an n-type transistor, and T4 is a p-type transistor.

When at least one embodiment shown in FIG. 9 is working, the control signal terminal SC is configured to provide a square wave control signal, and the square wave control signal can be provided by a timing controller chip;

When the control signal terminal SC provides a high voltage signal, T1 is turned off, T2 is turned on, VDD and VC1 are connected, M11, M21, M31, M41, M51 and M61 are turned on, and in the normal data voltage supply mode; T3 is turned on, T4 is turned off, GD and VC2 are connected, each second switching transistor and each third switching transistor are turned off;

When the control signal terminal SC provides a low voltage signal, T1 is turned on, T2 is turned off, GD and VC1 are connected, and each first switching transistor is turned on; T3 is turned off, T4 is turned on, each second switching transistor and each third switching transistor are turned on, and in V-HSR mode.

The display device according to the embodiment of the present disclosure includes a plurality of rows gate lines, a plurality of columns data lines, a plurality of rows and a plurality of columns of pixels, a driving circuit and the above-mentioned data voltage supply circuit; the driving circuit is electrically connected to the plurality of rows gate lines, and configured to provide driving signals to the gate lines;

Pixels located in the same row are electrically connected to corresponding row gate line for receiving the driving signal provided by the corresponding row gate line;

Pixels located in the same column are electrically connected to corresponding column data line for receiving the data voltage from the corresponding column data line.

The driving method described in the embodiment of the present disclosure is applied to the above-mentioned display device. The driving method includes:

During a driving period, providing, by the driving circuit, the driving signal to the gate line to control a plurality of rows scanning lines to be turned on sequentially;

During the driving period, there is an overlapping time period and a non-overlapping time period between valid time periods of the scanning signals provided by at least two adjacent gate lines among the plurality of rows gate lines that are turned on sequentially;

The data voltage received by the data line during at least part of the overlapping time period being the same as the data voltage received by the data line during at least part of the non-overlapping time period.

Figure 10:
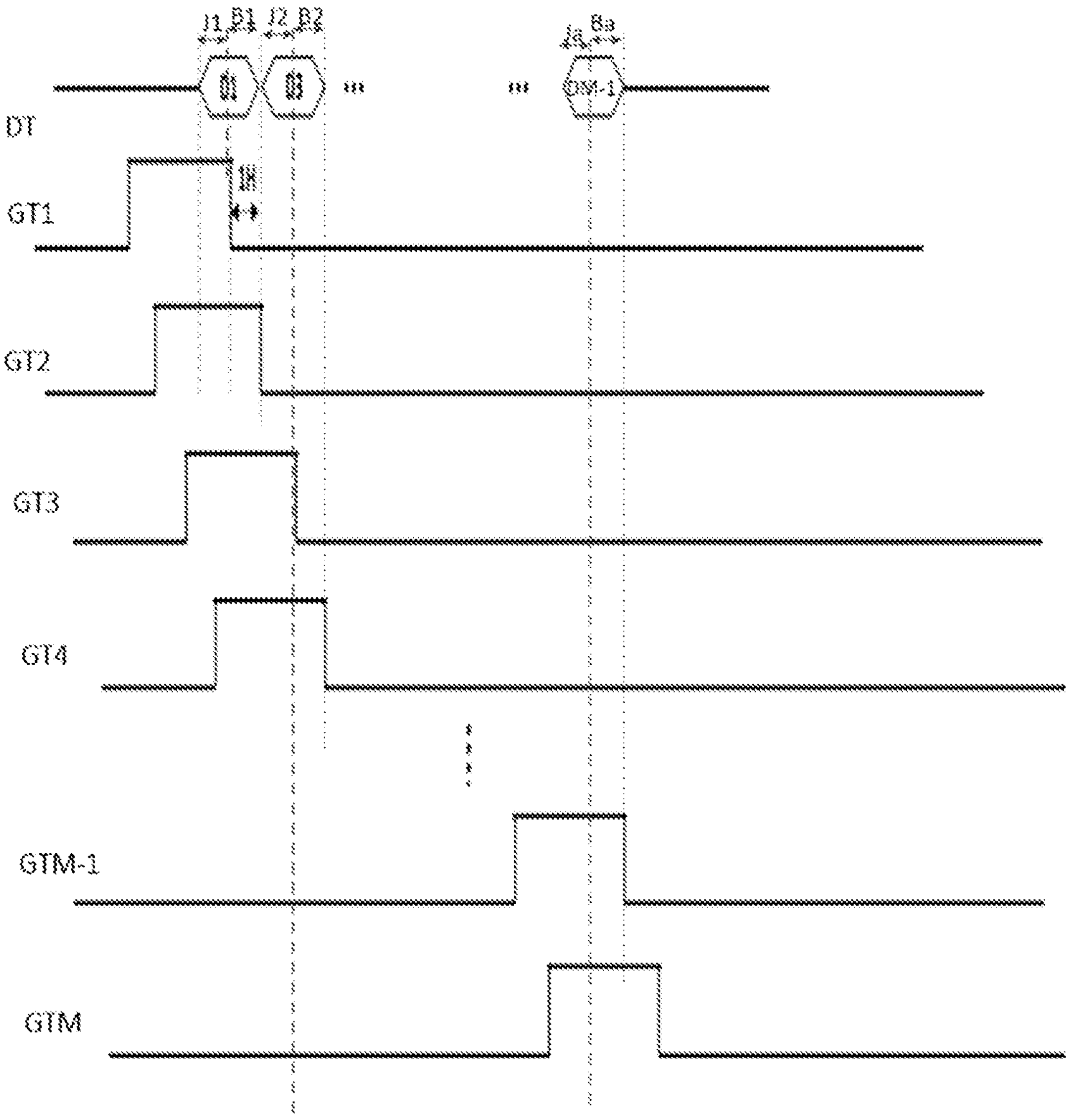
FIG. 10 is a waveform diagram corresponding to the driving method according to at least one embodiment of the present disclosure.

As shown in FIG. 10, when the display device according to at least one embodiment of the present disclosure includes M rows of sub-pixels and M rows scanning lines, and the sub-pixels located in the mth row are electrically connected to the mth row scanning line (M is an integer greater than 1, m is a positive integer less than or equal to M), The display cycle may include a first overlapping period J1, a first non-overlapping period B1, a second overlapping period J2, a second non-overlapping period B2, the ath overlapping period Ja and the ath non-overlapping period Ba (a is a positive integer);

During the first overlapping period J1, the data line DT provides the first row data voltage D1, GT1 and GT2 are turned on, and the first row of sub-pixels and the second row of sub-pixels receive the first row data voltage D1;

During the first non-overlapping period B1, the data line DT provides the first row data voltage D1, GT2 is turned on, and the second row of sub-pixels receives the first row data voltage D1;

During the second overlapping period J2, the data line DT provides the third row data voltage D3, GT3 and GT4 are turned on, and the third row sub-pixels and the fourth row sub-pixels receive the third row data voltage D3;

During the second non-overlapping period B2, the data line DT provides the third row data voltage D3, GT4 is turned on, and the fourth row sub-pixels receive the third row data voltage D3;

During the ath overlapping period Ja, the data line DT provides the (M-1)th row data voltage DM-1 of; GTM-1 and GTM are turned on, the (M-1)th row of subpixels and the Mth row of subpixels are turned on, and the (M-1)th row of subpixels and the Mth row of sub-pixels receive the M-1-th row data voltage DM-1;

During the ath non-overlapping period Ba, the data line DT provides the (M-1)th row data voltage DM; GTM is turned on, the Mth row of sub-pixels are turned on, and the Mth row of sub-pixels receive the (M-1)th row data voltage DM-1.

In at least one embodiment shown in FIG. 10, J1 is a partial overlapping period between the high voltage period of the first scan signal and the high voltage period of the second scan signal;

B1 is a partial non-overlapping period between the high voltage period of the first scanning signal and the high voltage period of the second scanning signal;

J2 is the partial overlapping period between the high voltage period of the third scanning signal and the high voltage period of the fourth scanning signal;

B2 is the partial non-overlapping time period between the high voltage period of the third scanning signal and the high voltage period of the fourth scanning signal;

Ja is the partial overlapping time period between the high voltage period of the (M-1)th scan signal and the high voltage period of the Mth scan signal;

Ba is a partial non-overlapping time period between the high voltage period of the (M-1)th scan signal and the high voltage period of the Mth scan signal.

In at least one embodiment as shown in FIG. 10, the display device operates in HSR mode.

The driving method described in the embodiment of the present disclosure is applied to the above-mentioned display device. The driving cycle includes a plurality of sequentially arranged driving phases; the (2n−1)th row scanning signal provided by the (2n−1)th row scanning line is the same as the 2nth row scanning signal provided by the 2nth row scanning line; the driving method includes:

In an nth driving phase, the (2n−1)th row scan line and the 2nth row scan line are turned on, and the (2n−1)th row of sub-pixels and the 2nth row of sub-pixels receive the data voltage provided by the corresponding data line;

n is a positive integer.

Figure 11:
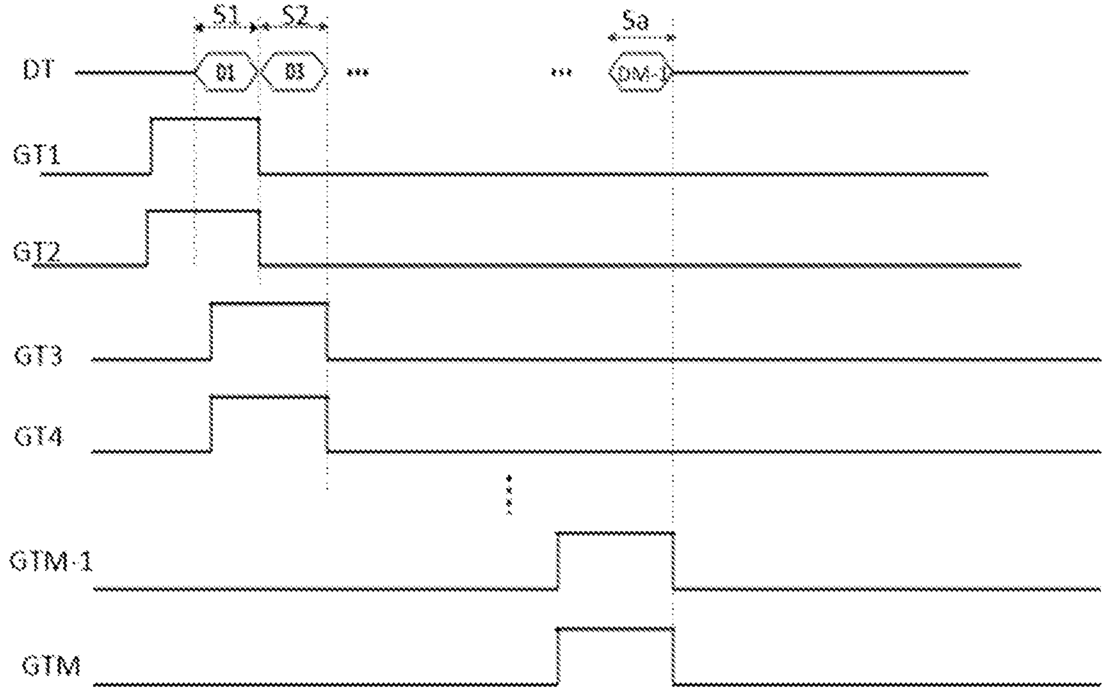
FIG. 11 is a waveform diagram corresponding to the driving method according to at least one embodiment of the present disclosure.

As shown in FIG. 11, when the array substrate according to at least one embodiment of the present disclosure includes M rows of sub-pixels and M rows scanning lines, and the sub-pixels located in the $m^{th}$ row are electrically connected to the mth row scanning line (M is an integer greater than 1, m is a positive integer less than or equal to M), The first scanning signal provided by the first row scanning line GT1 is the same as the second scanning signal provided by the second row scanning line GT2. The third scanning signal provided by the third row scanning line GT3 is the same as the fourth scanning signal provided by the fourth row scanning line GT4. The (M-1)th scanning signal provided by the (M-1)th scanning line GTM-1 is the same as the Mth scanning signal provided by the Mth scanning line GTM;

The display cycle includes a plurality of driving phases set in sequence; S1 is the first driving phase, S2 is the second driving phase, and SM is the Mth phase;

The first driving phase S1 is an overlapping period between the high voltage period of the second scanning signal and the high voltage period of the third scanning signal;

The second driving phase S2 is an overlapping period of the high voltage period of the fourth scan signal and the high voltage period of the fifth scan signal provided by the fifth row scan line;

The ath driving phase Sa is the last 2H time included in the Mth scanning signal (a is a positive integer);

In the first driving phase S1, the data line DT provides the first row data voltage D1, GT1, GT2, GT3 and GT4 are turned on, and the sub-pixels located in the first row, the sub-pixels located in the second row, and the sub-pixels located in the third row and the sub-pixel located in the fourth row are turned on and receive the first row data voltage D1;

In the second driving phase S2, the data line DT provides the third row data voltage D3, GT3, GT4, the fifth row scan line and the sixth row scan line are turned on, and the sub-pixels located in the third row, the sub-pixels located in the fourth row, The sub-pixels located in the fifth row and the sub-pixels located in the sixth row are turned on and receive the third row data voltage D3;

In the ath driving phase Sa, the data line DT provides the (M-1)th row data voltage DM-1, GTM-1 and GTM are turned on, the sub-pixels located in the (M-1)th row and the sub-pixels located in the Mth row are turned on, and receive the (M-1)th row data voltage DM-1.

In at least one embodiment shown in FIG. 11, the display device operates in a dual-line gate (DLG) mode.

In order to achieve refresh rate doubling, the refresh rate of the driving signal is doubled, and two rows of pixels are given the same data signal, so that the display device work in HSR mode or DLG mode.

In specific implementation, when the even-numbered row data signal is the same as the odd-numbered row data signal, and the data amount of the data signal is halved, a 2× refresh rate can be achieved;

When an even-numbered column does not require data signal input and the even-numbered column data signal is obtained by averaging the adjacent columns data signals, the data amount of data signal is halved and a 2× refresh rate can be achieved;

When the even-numbered row data signal is the same as the odd-numbered row data signal, and the even-numbered column does not require data signal input, and the even-numbered column data signal is obtained by averaging the adjacent columns data signals, a 4× refresh rate can be achieved.

At least one embodiment of the present disclosure enables low-resolution signals to drive a high-resolution screen.

The above descriptions are implementations of the present disclosure. It should be pointed out that those skilled in the art can make some improvements and modifications without departing from the principle of the present disclosure. These improvements and modifications shall also fall within the scope of the present disclosure.

What is claimed is:

1. A data voltage supply circuit, applied to a display device, wherein:

the display device comprises a data driver, a plurality of columns of pixels and a plurality of columns data lines, a column of pixels comprises M columns of sub-pixels; M is an integer greater than or equal to 3; the data driver comprises a plurality of data voltage supply terminals; the data voltage supply circuit comprises a plurality of supply circuits;

a supply circuit is configured to control the M columns of sub-pixels comprised in a corresponding column of pixels to respectively receive a data voltage provided by a corresponding data voltage supply terminal, or to control the M columns of sub-pixels comprised in the corresponding column of pixels to obtain the data voltage provided to the M columns of sub-pixels according to a data voltage provided to at least one other column of pixels;

the supply circuit comprises a first gating circuit and a second gating circuit; the column of sub-pixels are electrically connected to a corresponding column data line, and receive the data voltage through the corresponding column data line;

the first gating circuit is electrically connected to the M data voltage supply terminals and current M columns data lines respectively, and is configured to control to connect or disconnect an mth data voltage supply terminal among the M data voltage supply terminals and an mth data line among the current M columns data lines; the mth data line is electrically connected to the mth column of sub-pixels in the M columns of sub-pixels comprised in the corresponding column of pixels; m is a positive integer less than or equal to M;

the second gating circuit is respectively electrically connected to the current M columns data lines, a first group of M columns data lines electrically connected to the M columns of sub-pixels comprised in a first target column of pixels, and a second group of M columns data lines electrically connected to M columns of the sub-pixels comprised in a second target column of pixels, configured to control the data voltages received by the current M columns data lines according to the data voltage received by the first group of M columns data line and the data voltage received by the second group of M columns data lines;

the first target column of pixels is a column of pixels except the corresponding column of pixels, the second target column of pixels is a column of pixels except the corresponding column of pixels, the first target column of pixels and the second target column of pixels are different columns of pixels;

the current M columns data lines are data lines electrically connected to the M columns of sub-pixels comprised in the corresponding column of pixels; and the data lines electrically connected to the M columns of sub-pixels in the first target column of pixels are directly electrically connected to a corresponding data voltage supply terminal, and the data lines electrically connected to the M columns of sub-pixels in the second target column of pixels are directly electrically connected to a corresponding data voltage supply terminal.

2. The data voltage supply circuit according to claim 1, wherein the first gating circuit comprises M first switch circuits;

an mth first switch circuit is electrically connected to the mth data voltage supply terminal among the M data voltage supply terminals and the mth data line among the current M columns data lines, respectively, and is configured to control to connect or disconnect the mth data voltage supply terminal and the mth data line.

3. The data voltage supply circuit according to claim 2, wherein the mth first switching circuit comprises the mth first switching transistor;

a gate electrode of the mth first switching transistor is electrically connected to a first control voltage terminal, a first electrode of the mth first switching transistor is electrically connected to the mth data voltage supply terminal, and a second electrode of the mth first switching transistor is electrically connected to the mth data line;

the data voltage supply circuit comprises a first control circuit;

the first control circuit is configured to provide a first control voltage to the first control voltage terminal to control the mth first switching transistor to be turned on or off.

4. The data voltage supply circuit according to claim 1, wherein the second gating circuit comprises M second switch circuits, M first resistors, M third switch circuits and M second resistors;

an mth second switch circuit is electrically connected to the mth column data line in the first group of M columns data lines and a first terminal of the mth first resistor, respectively, and is configured to control to connect or disconnect the mth column data line in the first group of M columns data lines and the first terminal of the mth first resistor; a second terminal of the mth first resistor is electrically connected to the mth column data line in the current M columns data lines;

a first terminal of the mth second resistor is electrically connected to the mth column data line among the current M columns data lines, and the mth third switch circuit is respectively electrically connected to the second terminal of the mth second resistor and the mth column data line in the second group of M columns data lines, and is configured to control to connect or disconnect the second terminal of the mth second resistor and the mth column data line in the second group of M columns data lines.

5. The data voltage supply circuit according to claim 4, wherein the mth second switching circuit comprises an mth second switching transistor, and the mth third switching circuit comprises an mth third switching transistor;

a gate electrode of the mth second switching transistor is electrically connected to a second control voltage terminal, and a first electrode of the mth second switching transistor is connected to the mth column data in the first group of M columns data lines, a second electrode of the mth second switching transistor is electrically connected to the first terminal of the mth first resistor;

a gate electrode of the mth third switching transistor is electrically connected to the second control voltage terminal, and a first electrode of the mth third switching transistor is electrically connected to the second terminal of the mth second resistor, a second electrode of the mth third switching transistor is electrically connected to the mth column data line in the second group of M columns data lines;

the data voltage supply circuit comprises a second control circuit;

the second control circuit is configured to provide a second control voltage to the second control voltage terminal to control the mth second switching transistor to be turned on or off, and to control the mth third switching transistor to be turned on or off.

6. The data voltage supply circuit according to claim 1, wherein the data driver comprises at least one data driving circuit; the column of pixels comprises three columns of sub-pixels;

the data driving circuit comprises N data voltage supply terminals; N is a positive integer;

an ath supply circuit comprises an ath first gating circuit and an ath second gating circuit; a is a positive integer;

a first column of sub-pixels comprised in a (3a−1)th column of pixels is electrically connected to a (6a−2)th column data line, a second column of sub-pixels comprised in the (3a−1)th column of pixels is electrically connected to a (6a−1)th column data line, and a third column of sub-pixels include comprised in the (3a−1)th column data line is electrically connected to a 6ath column data line;

a first column of sub-pixels include comprised in a (3a−2)th column of pixels is electrically connected to a (6a−5)th column data line, a second column of sub-pixels include comprised in the (3a−2)th column of pixels is electrically connected to a (6a−4)th column data line, and a third column of sub-pixels include comprised in the (3a−2)th column data line is electrically connected to a (6a−3)th column data line;

a first column of sub-pixels include comprised in a 3ath column of pixels is electrically connected to a (6a+1)th column data line, a second column of sub-pixels include comprised in the 3ath column of pixels is electrically connected to a (6a+2)th column data line, and a third column of sub-pixels include comprised in the 3ath column data line is electrically connected to a (6a+3)th column data line;

the ath first gating circuit is respectively connected to the (6a−2)th column data line, the (6a−1)th column data line, the 6ath column data line, a (6a−2)th data voltage supply terminal, a (6a−1)th data voltage supply terminal, and a 6ath data voltage supply terminal, and is configured to control to connect or disconnect the (6a−2)th column data line and the (6a−2)th data voltage supply terminal, control to connect or disconnect the (6a−1)th column data line and the (6a−1)th data voltage supply terminal, and control to connect or disconnect the bath column data line and the 6ath data voltage supply terminal;

the ath second gating circuit is respectively electrically connected to the (6a−5)th column data line, the (6a−4)th column data line, the (6a−3)th column data line, the (6a+1)th column data line, the (6a+2)th column data line and the (6a+3)th column data line, the (6a−2)th column data line, the (6a−1)th column of data line and the 6ath column data line, and is configured to control the data voltage received by the (6a−2)th column data line according to the data voltage received by the (6a−5)th column data line and the data voltage received by the (6a+1)th column data line, control the data voltage received by the the (6a−1)th column data line according to the data voltage received by the (6a−4)th column data line and the data voltage received by the (6a+2)th column data line, control the data voltage received by the 6ath column data line according to the data voltage received by the (6a−3)th column data line and the data voltage received by the (6a+3)th column data line;

the (6a−5)th column data line is directly electrically connected to the (6a−5)th data voltage supply terminal, the (6a−4)th column data line is directly electrically connected to the (6a−4)th data voltage supply terminal, the (6a−3)th column data line is directly electrically connected to the (6a−3)th data voltage supply terminal, the (6a+1)th column data line is directly electrically connected to the (6a+1)th data voltage supply terminal, the (6a+2)th column data line is directly electrically connected to the (6a+2)th data voltage supply terminal, the (6a+3)th column data line is directly electrically connected to the (6a+3)th data voltage supply terminal.

7. The data voltage supply circuit according to claim 6, wherein N is multiple of 6;

the data voltage supply circuit comprises a fourth gating circuit;

the fourth gating circuit is respectively connected to an Nth column data line, an (N−1)th column data line, an (N−2)th column data line, an (N−3)th column data line, an (N−4)th column data line and an (N−5)th column data line, configured to control to connect or disconnect the Nth column data line and the (N−3)th column data line, and control to connect or disconnect the (N-1) th column data line and the (N−4)th column data line, and control to connect or disconnect the (N−2)th column data line and the (N−5)th column data line.

8. The data voltage supply circuit according to claim 6, wherein N is multiple of 6, and the data driver comprises B data driver circuits; B is an integer greater than 1;

a bth data driving circuit is electrically connected to a bth group of N columns data lines, a (b+1)th data circuit is electrically connected to a (b+1)th group of N columns data lines, b is a positive integer, and b+1 is less than or equal to B;

the data voltage supply circuit comprises a fifth gating circuit;

the fifth gating circuit is respectively connected to the (N−5)th data line in the bth group of N columns data lines, the (N−4)th data line in the bth group of N columns data lines, and the (N−3) th data line in the bth group of N columns data lines, the (N−2)th data line in the bth group of N columns data lines, the (N−1)th data line in the bth group of N columns data lines, the Nth data line in the bth group of N columns data lines, a first column data line in the (b+1)th group of N columns data lines, a second column data line in the (b+1)th group of N columns data lines, and a third column data line in the (b+1)th group of N columns data lines, and is configured to control the data voltage received by the (N−2)th data line in the bth group of N columns data lines according to the data voltage received by the (N−5)th data line in the bth group of N columns data lines and the first column data line in the (b+1)th group of N columns data lines, control the data voltage received by the (N−1)th data line in the bth group of N columns data lines according to the data voltage received by the (N−4)th data line in the bth group of N columns data lines and the data voltage received by the second column data line in the (b+1)th group of N columns data lines, control the data voltage received by the Nth data line in the bth group of N columns data lines according to the data voltage received by the (N−3)th data line in the bth group of N columns data lines and the data voltage received by the third column data line in the (b+1)th group of N columns data lines.

9. A display device, comprising a plurality of rows gate lines, a plurality of columns data lines, a plurality of rows and a plurality of columns of pixels, a driving circuit and the data voltage supply circuit according to claim 1; wherein the driving circuit is electrically connected to the plurality of rows gate lines, and configured to provide a driving signals to the gate line;

pixels located in a same row are electrically connected to a corresponding row gate line, configured to receive the driving signal provided by the corresponding row gate line;

pixels located in a same column are electrically connected to a corresponding column data line, configured to receive the data voltage from the corresponding column data line.

10. A driving method, applied to the display device according to claim 9, wherein the driving method comprises:

during a driving period, providing, by the driving circuit, the driving signal to the gate line to control a plurality of rows scanning lines to be turned on sequentially;

during the driving period, there being an overlapping time period and a non-overlapping time period between valid time periods of scanning signals provided by at least two adjacent gate lines among the plurality of rows gate lines that are turned on sequentially;

the data voltage received by the data line during at least part of the overlapping time period being the same as the data voltage received by the data line during at least part of the non-overlapping time period.

11. A driving method, applied to the display device according to claim 9, wherein the driving cycle comprises a plurality of driving phases arranged sequentially; a (2n−1)th row scanning signal provided by a (2n−1)th row scanning line is the same as a 2nth row scanning signal provided by a 2nth row scanning line; the driving method comprises:

in an nth driving phase, the (2n−1)th row scan line and the 2nth row scan line being turned on, and the (2n−1)th row of sub-pixels and the 2nth row of sub-pixels receiving the data voltage provided by the corresponding data line;

n is a positive integer.

12. The display device according to claim 9, wherein the first gating circuit comprises M first switch circuits;

an mth first switch circuit is electrically connected to the mth data voltage supply terminal among the M data voltage supply terminals and the mth data line among the current M columns data lines, respectively, and is configured to control to connect or disconnect the mth data voltage supply terminal and the mth data line.

13. The display device according to claim 9, wherein the second gating circuit comprises M second switch circuits, M first resistors, M third switch circuits and M second resistors;

an mth second switch circuit is electrically connected to the mth column data line in the first group of M columns data lines and a first terminal of the mth first resistor, respectively, and is configured to control to connect or disconnect the mth column data line in the first group of M columns data lines and the first terminal of the mth first resistor; a second terminal of the mth first resistor is electrically connected to the mth column data line in the current M columns data lines;

a first terminal of the mth second resistor is electrically connected to the mth column data line among the current M columns data lines, and the mth third switch circuit is respectively electrically connected to the second terminal of the mth second resistor and the mth column data line in the second group of M columns data lines, and is configured to control to connect or disconnect the second terminal of the mth second resistor and the mth column data line in the second group of M columns data lines.

14. A data voltage supply circuit, applied to a display device, wherein:

the display device comprises a data driver, a plurality of columns of pixels and a plurality of columns data lines, a column of pixels comprises M columns of sub-pixels; M is an integer greater than or equal to 3; the data driver comprises a plurality of data voltage supply terminals; the data voltage supply circuit comprises a plurality of supply circuits;

a supply circuit is configured to control the M columns of sub-pixels comprised in a corresponding column of pixels to respectively receive a data voltage provided by a corresponding data voltage supply terminal, or to control the M columns of sub-pixels comprised in the corresponding column of pixels to obtain the data voltage provided to the M columns of sub-pixels according to a data voltage provided to at least one other column of pixels;

the data driver comprises at least one data driving circuit; the column of pixels comprises three columns of sub-pixels;

the data driving circuit comprises N data voltage supply terminals; N is a positive integer;

an ath supply circuit comprises an ath first gating circuit and an ath second gating circuit; a is a positive integer;

a first column of sub-pixels comprised in a (3a−1)th column of pixels is electrically connected to a (6a−2)th column data line, a second column of sub-pixels comprised in the (3a−1)th column of pixels is electrically connected to a (6a−1)th column data line, and a third column of sub-pixels comprised in the (3a−1)th column data line is electrically connected to a bath column data line;

a first column of sub-pixels comprised in a (3a−2)th column of pixels is electrically connected to a (6a−5)th column data line, a second column of sub-pixels comprised in the (3a−2)th column of pixels is electrically connected to a (6a−4)th column data line, and a third column of sub-pixels comprised in the (3a−2)th column data line is electrically connected to a (6a−3)th column data line;

a first column of sub-pixels comprised in a 3ath column of pixels is electrically connected to a (6a+1)th column data line, a second column of sub-pixels comprised in the 3ath column of pixels is electrically connected to a (6a+2)th column data line, and a third column of sub-pixels comprised in the 3ath column data line is electrically connected to a (6a+3)th column data line;

the ath first gating circuit is respectively connected to the (6a−2)th column data line, the (6a−1)th column data line, the bath column data line, a (6a−2)th data voltage supply terminal, a (6a−1)th data voltage supply terminal, and a 6ath data voltage supply terminal, and is configured to control to connect or disconnect the (6a−2)th column data line and the (6a−2)th data voltage supply terminal, control to connect or disconnect the (6a−1)th column data line and the (6a−1)th data voltage supply terminal, and control to connect or disconnect the 6ath column data line and the 6ath data voltage supply terminal;

the ath second gating circuit is respectively electrically connected to the (6a−5)th column data line, the (6a−4)th column data line, the (6a−3)th column data line, the (6a+1)th column data line, the (6a+2)th column data line and the (6a+3)th column data line, the (6a−2)th column data line, the (6a−1)th column of data line and the 6ath column data line, and is configured to control the data voltage received by the (6a−2)th column data line according to the data voltage received by the (6a−5)th column data line and the data voltage received by the (6a+1)th column data line, control the data voltage received by the the (6a−1)th column data line according to the data voltage received by the (6a−4)th column data line and the data voltage received by the (6a+2)th column data line, control the data voltage received by the bath column data line according to the data voltage received by the (6a−3)th column data line and the data voltage received by the (6a+3)th column data line; and the (6a−5)th column data line is directly electrically connected to the (6a−5)th data voltage supply terminal, the (6a−4)th column data line is directly electrically connected to the (6a−4)th data voltage supply terminal, the (6a−3)th column data line is directly electrically connected to the (6a−3)th data voltage supply terminal, the (6a+1)th column data line is directly electrically connected to the (6a+1)th data voltage supply terminal, the (6a+2)th column data line is directly electrically connected to the (6a+2)th data voltage supply terminal, the (6a+3)th column data line is directly electrically connected to the (6a+3)th data voltage supply terminal.

* * * * *